March 26, 1968 T. J. SCUITTO ETAL 3,375,498

CALCULATOR APPARATUS FOR DISTINGUISHING MEANINGFUL DIGITS

Filed May 18, 1964 9 Sheets-Sheet 1

INVENTORS
THOMAS J. SCUTTO
MATTHEW A. ALEXANDER
BY Samuel Lindenberg
Arthur Freilich
ATTORNEYS INVENTORS
THOMAS J. SCUITTO
MATTHEW A. ALEXANDER
BY Samuel Lindenberg
Arthur Freilich
ATTORNEYS

CALCULATOR APPARATUS FOR DISTINGUISHING MEANINGFUL DIGITS

Filed May 18, 1964

INVENTORS
THOMAS J. SCUTTO
MATTHEW A. ALEXANDER
BY Samuel Lindenberg
Arthur Freilich
ATTORNEYS INVENTORS
THOMAS J. SCUTTO
MATTHEW A. ALEXANDER
BY Samuel Lindenberg
Arthur Freilich
ATTORNEYS INVENTORS
THOMAS J. SCUTTO
MATTHEW A. ALEXANDER
BY Samuel Lindenberg
Arthur Freilich
ATTORNEYS

CALCULATOR APPARATUS FOR DISTINGUISHING MEANINGFUL DIGITS

Filed May 18, 1964

THOMAS J. SCUTTO
MATTHEW A. ALEXANDER
INVENTORS

BY Samuel Lindenberg
Arthur Freilich
ATTORNEYS

RESET (000)

STATE IIA (010)

TO IIIA $_1S_1 = \bar{S}_3 S_2 \bar{S}_1 O_D \cdot E_D \bar{L}_1$

INVENTORS
THOMAS J. SCUTTO
MATTHEW A. ALEXANDER
BY Samuel Lindenberg
Arthur Freilich
ATTORNEYS March 26, 1968 T. J. SCUITTO ETAL 3,375,498

CALCULATOR APPARATUS FOR DISTINGUISHING MEANINGFUL DIGITS

Filed May 18, 1964

9 Sheets-Sheet 9

INVENTORS
THOMAS J. SCUTTO
MATTHEW A. ALEXANDER
BY Samuel Lindenberg
Arthur Freilich
ATTORNEYS 3,375,498

CALCULATOR APPARATUS FOR DISTINGUISHING MEANINGFUL DIGITS

Thomas J. Scuitto, Malibu, and Matthew A. Alexander, Santa Monica, Calif., assignors to Wyle Laboratories, El Segundo, Calif., a corporation of California Filed May 18, 1964, Ser. No. 376,606
7 Claims. (Cl. 340—172.5)

ABSTRACT OF THE DISCLOSURE

A calculating apparatus of the type having output display means and including means for visually distinguishing meaningful digits from non-meaningful digits. The apparatus includes means for automatically editing all of the numbers stored in the various registers after the performance of most operations. Editing is comprised of examining each of the numbers and determining whether or not each digit thereof is meaningful. A tag is then associated with each of the meaningful digits. Any non-zero digit is considered meaningful. Also, all digits positioned between the most significant digit in a number and the decimal point are considered meaningful and likewise all digits positioned between the least significant digit and the decimal point are considered meaningful.

This invention relates generally to calculating apparatus of the type having output display means and more particularly to means in such apparatus for visually distinguishing, in each displayed number, the meaningful digits from those which are not meaningful.

U.S. patent application Ser. No. 314,387 filed on Oct. 7, 1963, now Patent No. 3,330,946, and assigned to the same assignee as the present application discloses a calculating apparatus incorporating a small memory, e.g. of the magnetic disc type, which defines a plurality of number storing registers. Means are provided for accessing the numbers from selected registers for initiating arithmetic operations on the accessed numbers and for subsequently storing the results of an operation back in a selected register. Output means including visual display means are provided for continually displaying the numbers stored in the registers. In order for the calculator to be of maximum utility, it should have sufficient capacity to handle and display numbers containing very many digits, e.g. approximately twenty. When numers of this length are displayed, it is often difficult for an operator to notice the existence of one non-zero digit in a long string of zero digits. In view of this, it is an object of the present invention to provide a calculating apparatus having means for distinguishing between meaningful and unmeaningful zero digits in stored numbers.

It is a further object of the present invention to provide a calculating apparatus having output display means and means for automatically visually distinguishing for an operator the meaningful zero digits in a number from those zero digits which are not meaningful.

Briefly, the invention is directed to apparatus for automatically editing all of the numbers stored in the various calculator registers after the performance of most calculator operations by examining each of the numbers and determining whether or not each digit thereof is meaningful. In response to such determinations, a tag is associated with each of the meaningful digits. In the preferred embodiment of the invention, any non-zero digit is considered a meaningful digit. Also, all digits positioned between the most significant digit in a number and the decimal point are considered meaningful and likewise all digits positioned between the least significant digit and the decimal point are considered meaningful. When there are non-zero digits to the right of the decimal point but none to the left, the first zero digit to the left of the decimal point is considered meaningful.

In the preferred embodiment of the invention in which the value of a digit is represented by the number of pulses recorded in the first ten bit positions of each digit sector in the memory, a pulse or tag bit is recorded in the subsequent bit position to identify a meaningful digit. The output display means displays those digits containing a tag bit at normal illumination and those digits not containing the tag bit at a dimmed illumination. As has been pointed out, an edit operation is performed on all of the stored numbers after most calculator operations to tag the meaningful digits. In addition, whenever a digit is entered by an operator via the calculator keyboard, it is automatically tagged.

In the aforecited U.S. patent application, means are provided for initiating a "preset" operation at the conclusion of most other calculator operations. The functions performed by the preset operation is to preset a count in a control counter which designates the appropriate digit sector into which the next digit, identified via the keyboard by the operator, should be entered. In accordance with the present invention, the edit operation is automatically initiated at the conclusion of other calculator operations and prior to the initiation of the preset operation.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
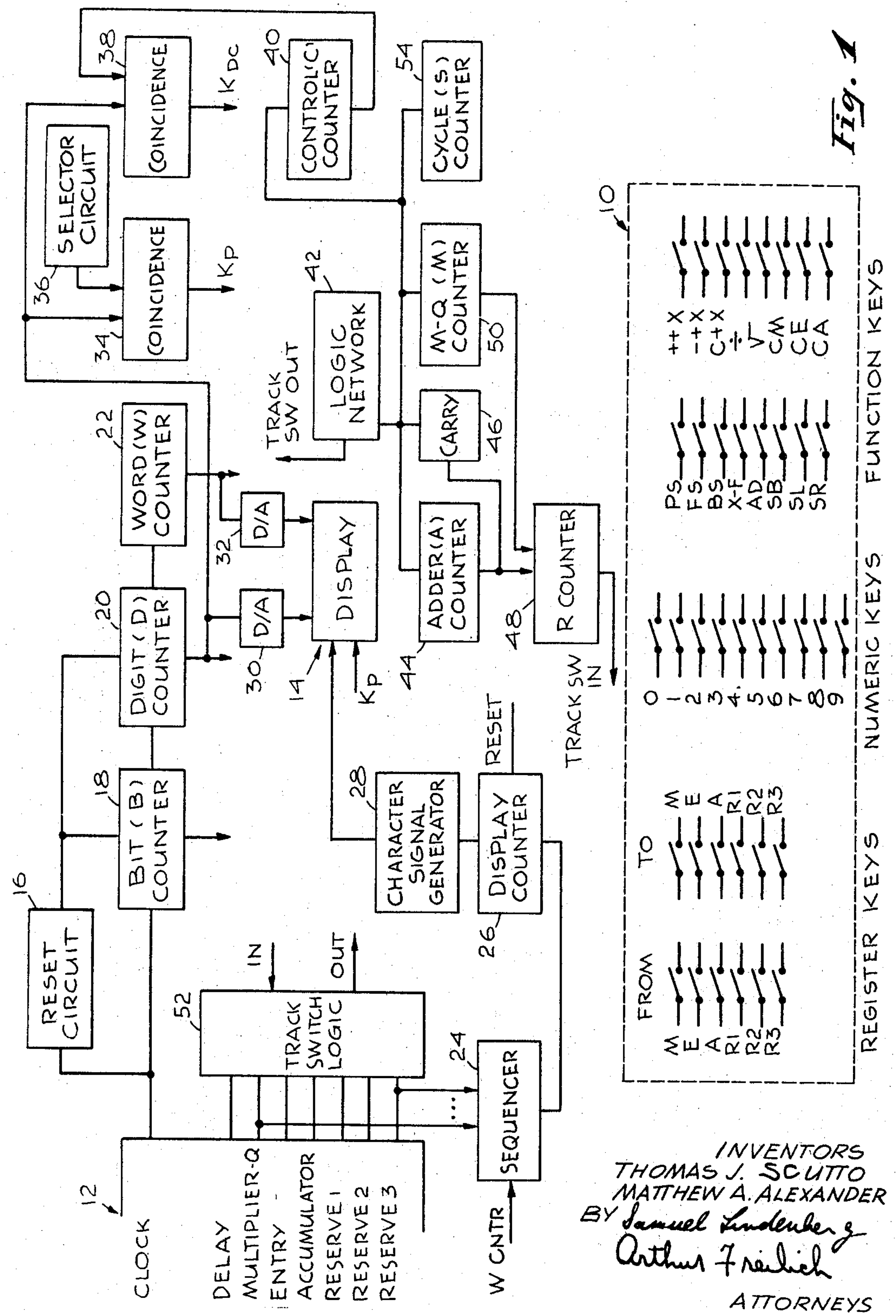
FIGURE 1 is a block schematic diagram illustrating the keyboard and principal components of the calculator.

Attention is now called to FIGURE 1 of the drawings which comprises a block schematic diagram of a preferred embodiment of the calculator apparatus which can incorporate the present invention. The details of the calculator apparatus of FIGURE 1 are discussed in the aforecited U.S. patent application Ser. No. 314,387, and only so much of the explanation as is necessary to understand the present invention will be repeated herein. The calculator apparatus includes a keyboard 10, a memory 12, a display device 14, and various other electronic circuits comprising logic, counter, and coincidence detection circuits.

Figure 2:
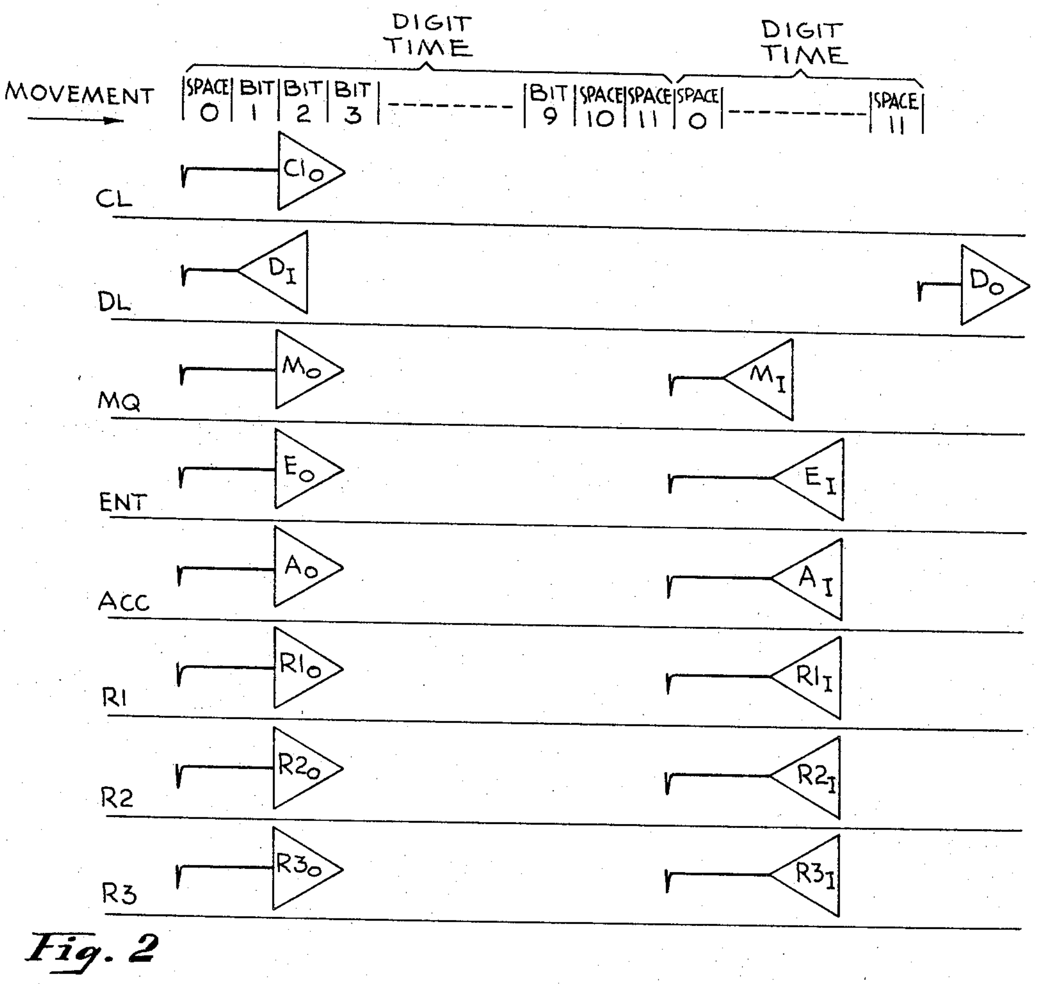
FIGURE 2 is a schematic diagram of the memory of FIGURE 1 specifically illustrating the write in and read out means associated with each memory track.
Figure 5:
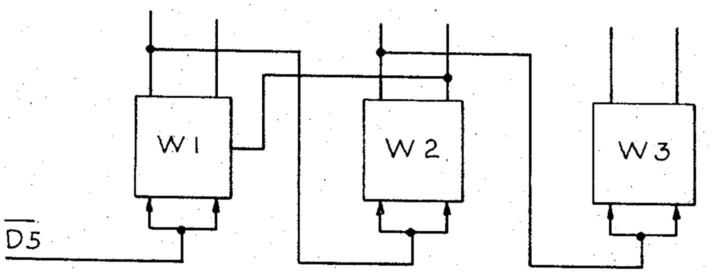
FIGURE 5 is a block schematic diagram of the word (W) counter of FIGURE 1.

The memory 12 is preferably of the movable magnetic media type, as for example disc or drum, and is provided with a plurality of tracks as shown in greater detail in FIGURE 2. The plurality of tracks in cudes a clock track, a delay track, and a plurality of register tracks respectively identified as the multiplier-quotient (M) register, the entry (E) register, the accumulator (A) register, and three reserve or scratch pad registers R1, R2, and R3. Each of the register tracks includes 28 digit sectors followed by a gap. Each of the digit sectors includes 9 bit positions and 3 space positions.

A magnetically recognizable mark or pulse is recorded in each of the bit and space positions of the clock track and is capable of being sensed by a head coupled to the input of clock track output amplifier $Cl_0$.

Aligned with the output amplifier $Cl_0$ head are heads coupled to the output amplifiers $M_0$, $E_0$, $A_0$, $R1_0$, $R2_0$, and $R3_0$ which are each respectively associated with the M, E, A, R1, R2, and R3 registers. Positioned so as to follow these output emplifier heads by one digit sector (note that the direction of disc movement is from left to righ and therefore a specific disc area initially passes under a head positioned to the left and subsequently passes under a head positioned to the right) are heads associated with the input amplifiers $M_I$, $E_I$, $A_I$, $R1_I$, $R2_I$, and $R3_I$.

Aligned with the output amplifier heads is a delay track head coupled to input amplifier $D_I$. Following the input amplifier $D_I$ head by two digit sectors is the head of an output amplifier $D_0$.

Information is stored in the memory in accordance with an incremental digital code. That is, for the digit "9," nine pulses (one pulse in each bit position of a digit sector) will be recorded on a track digit sector. For the number "932," nine pulses will be recorded in the hundred's digit sector, three pulses in the ten's digit sector, and 2 pulses in the unit's digit sector. Information can be so recorded in each of the memory tracks other than the clock track.

Connected to the amplifier $Cl_0$ is a reset circuit 16 (FIGURE 1) which functions to sense the previously mentioned gap and in response thereto to provide a reset signal once for each cycle of the memory. In addition to the reset circuit 16, a bit or B counter is connected to the amplifier $Cl_0$. Coupled to the B counter 18 is a digit or D counter 20 and coupled to the D counter 20 is a word or W counter 22.

The B counter is a four stage binary scale of twelve counter and is incremented by pulses derived from the memory clock track. The D counter 20 is a five stage binary counter and is reset once during each cycle of the disc by a reset signal provided by the reset circuit 16. The W counter 22 is a scale of six counters, each of its states being associated with a different one of the memory register tracks.

The contents of each of the memory registers is continually displayed by the display device 14. The output amplifiers associated with each of the memory registers is connected to a sequencing switch 24 which is operated in response to the states of the W counter 22. The state of the W counter selects the particular track whose contents are transferred through the sequencer 24 to the display counter 26. The display counter 26 functions to count the number of pulses recorded in each digit sector. The reset input terminal of the display counter 26 is controlled by the B counter 18 such that the display counter 26 is reset for each cycle of the B counter. The upper count, for each digit sector, in the display counter 26 is coupled to a character signal generator 28 which develops appropriate video signals and applies them to the display device 14 which is preferably of the cathode ray tube type. The video signals function to trace a digit represented by the count (number of pulses) in the digit sector in the memory register just read. The traced digit is properly placed on the display device 14 by the development of deflection signals by digital-to-analog converters 30 and 32 which are respectively connected to the output of the D counter 20 and W counter 22. Preferably, the W counter 22 controls the vertical deflection of the display device 14 and the D counter 20 controls the horizontal deflection. As a consequence, the digits in each of the numbers respectively stored in the memory registers are displayed displaced horizontally from one another across the face of the cathode ray tube display device and the numbers in the different registers are vertically spaced from one another.

The state of the D counter at all times defines the digit sector currently moving under the heads connected to the memory register output amplifiers and therefore the digit sector from which information can be immediately read. The output of the D counter 20 is connected to the input of a first coincidence circuit 34 along with the output of a selector circuit 36. The selector circuit 36 is a manually operable device including a decimal point selector portion and a preset selector portion. A number of a digit can be manually entered into either one of the portions. Coincidence between the state of the D counter 20 and the state of the decimal point selector portion is normally detected by the coincidence circuit 34 and a coincidence signal $K_p$ is provided as a manifestation of the coincidence. However, when the preset function flip-flop, referred to in greater detail below, is set, then the coincidence circuit 34 compares the D counter 20 with the number set into the preset selector portion. The signal $K_p$ is applied to the display device 14 to cause the appearance of a decimal point which is consequently aligned in all the registers. Similarly, a second coincidence circuit 38 is provided which detects coincidence between the D counter 20 and a control or C counter 40 to provide a coincidence signal $K_{DC}$. The control counter 40 can be manually set through the use of the preset function key to be described or can be set by a logic network 42. The state of the control counter identifies a particular digit sector and the coincidence signal $K_{DC}$ indicates when the digit stored therein can be operated upon.

Connected to the logic network 42 is an adder 44 which comprises a decade counter hereafter called the A counter. The output of the A counter is coupled to a carry flip-flop 46 and to an R counter 48. In addition, a multiplier-quotient or M decade counter 50 is provided and is also controlled by the logic network 42 and also has an output coupled to the input of R counter 48. Inputs to the A and M counters are derived from the output of a track switching logic network 52, coupled to the input and output amplifiers assoicated with the memory tracks through the logic network 42. The output of R counter 48 is connected to the input of the track switching logic network 52. A cycle or S counter 54 is provided for the purpose of defining a sequence of different states which are utilized in the performance of arithmetic operations, such as multiplication, for causing specific operations to be performed in a desired sequence.

The keyboard 10 consists of three sets of keys, namely a set of register keys, a set of numeric keys, and a set of function keys. The set of register keys has a subset of "from" keys and a subset of "to" keys. In each subset of keys, one key corresponds to a different one of each of the memory registers. The set of numeric keys includes ten keys each of which corresponds to a different decimal digit, i.e. zero through nine.

The set of function keys includes sixteen keys each of which is capable of initiating a different sequence of operations on numbers stored in the memory registers. The function keys and a description of the operations initiated by their respective actuations are as follows:

Preset (PS) functions to permit the control counter to be driven to a state designated by a manually settable means;

Forward Space (FS) causes the control counter to be decremented, as for example from count 14 to count 13, which means that the coincidence circuit 38 will generate the coincidence signal $K_{DC}$ when the thirteenth digit sector is in readable position rather than the fourteenth digit sector, the effect being noticeable on the display device 14 and being analogous to the function performed in response to the actuation of a typewriter space key.

Backspace (BS) permits the control counter to be incremented by one which thereby means that the coincidence signal $K_{DC}$ generated by the coincidence circuit 38 will be generated when e.g. the fifteenth rather than the fourteenth digit sector is in a readable position.

Transfer (XF) permits information to be transferred from a first designated memory register to a second memory register;

Add (AD) permits the contents of a designated register to be added to the contents of the accumulator register, the sum remaining in the accumulator register;

Subtract (SB) permits the contents of a designated register to be subtracted from the contents of the accumulator register, the difference remaining in the accumulator register;

Shift Left (SL) permits the contents of a designated register to be shifted one digit to the left (effectively multiplying by 10);

Shift Right (SR) permits the contents of a designated register to be shifted one digit to the right (effectively dividing by 10);

Add and Multiply (+ and ×) permits the numbers in the multiplier-quotient register and entry register to be multiplied and the product added to the number in the accumulator register;

Subtract and Multiply (— and ×) permits the numbers in the multiplier-quotient register and entry register to be multiplied and the product subtracted from the number in the accumulator register;

Clear and Multiply (C and ×) causes the accumulator to be cleared prior to entering the product of the numbers in the multiplier-quotient register and entry register;

Divide (÷) causes the contents of the entry register to be divided into the contents of the accumulator register with the quotient being provided in the multiplier-quotient register which is initially cleared;

Square Root (√) causes the root of the number in the accumulator register to be developed and stored in the multiplier-quotient register, both the entry and multiplier-quotient registers being initially cleared;

Clear Multiplier-Quotient register (CM) causes the contents of the multiplier-quotient register to be reduced to zero;

Clear Entry register (CE) causes the contents of the entry register to be reduced to zero; and Clear Accumulator register (CA) causes the contents of the accumulator register to be reduced to zero.

Figures 3A, 3B:
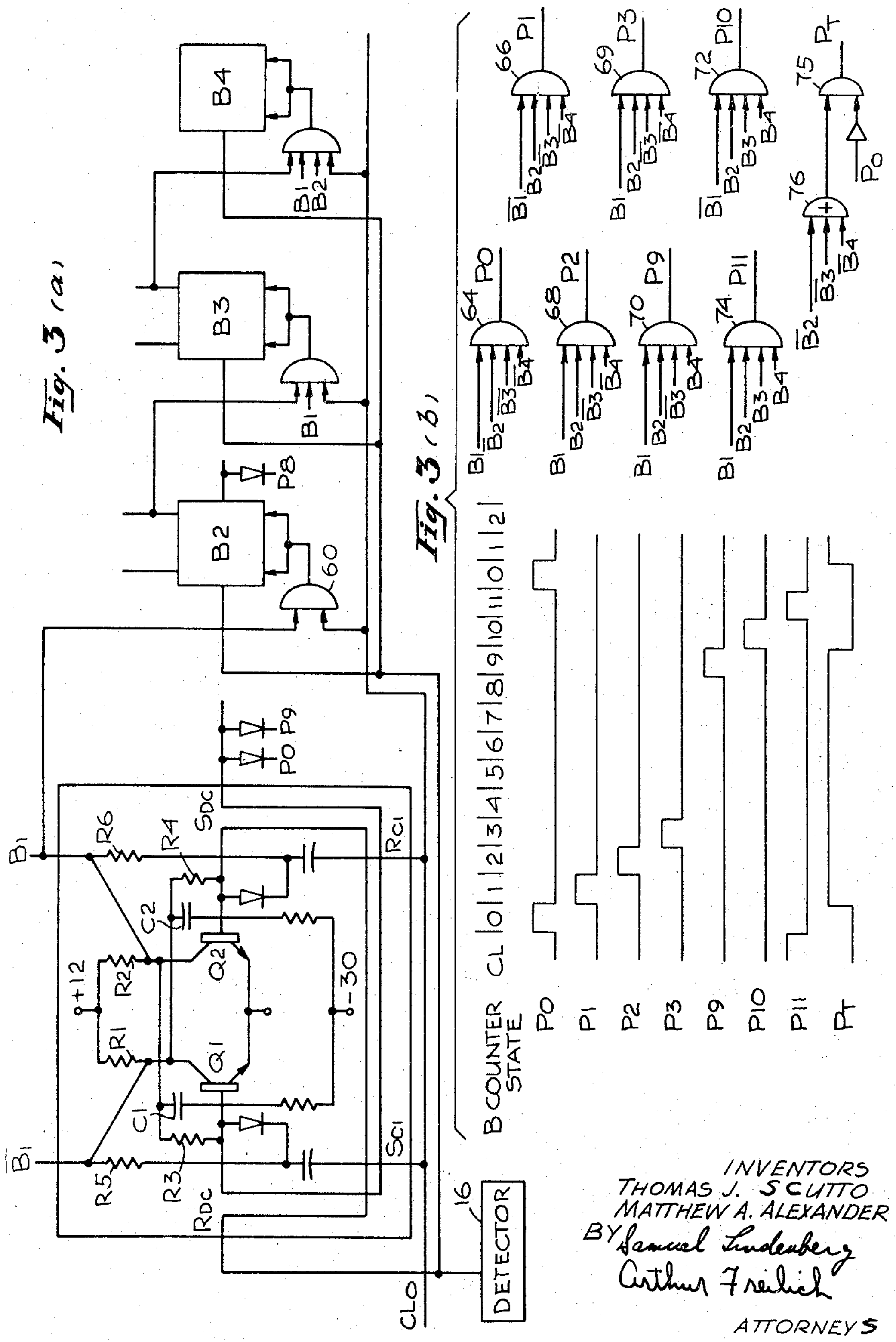
FIGURE 3(*a*) is a block schematic diagram of the bit (B) counter of FIGURE 1 and FIGURES 3(*b*) illustrates the gating means utilized to form the illustrated timing signals based on the state of the B counter.

Attention is now directed to FIGURE 3(*a*) which schematically illustrates the construction of the B counter 18 of FIGURE 1. The B counter includes four stages, respectively identified as B1, B2, B3, and B4, each stage comprising a solid state flip-flop circuit. Each of the B counter flip-flop circuits is identical to the circuit illustrated for the flip-flop B1. The circuit of flip-flop B1 includes a pair of transistors Q1 and Q2, both of the NPN type. The transistors Q1 and Q2 have their emitters connected together and to a source of negative potential, nominally shown as −12 volts. The collectors of each of the transistors Q1 and Q2 are respectively connected through resistors R1 and R2 to a source of positive potential, nominally shown as +12 volts. Connected in parallel between the collector of transistor Q2 and the base of transistor Q1 are a resistor R3 and a capacitor C1. Similarly connected in parallel between the collector of transistor Q1 and the base of transistor Q2 are a resistor R4 and a capacitor C2. A first series circuit branch including a capacitor C3 and a diode D1 is connected to the base of transistor Q1. Similarly, a second series branch including a capacitor C4 and a diode D2 is connected to the base of transistor Q2. Resistors R5 and R6 repsectively couple the collectors of transistors Q1 and Q2 to the junctions in the first and second series branches. Resistors R7 and R8 respectively couple the bases of transistors Q1 and Q2 to a source of negative potential, nominally shown as −30 volts. Reset and set input terminals respectively identified as $R_{DC}$ and $S_{DC}$ are connected to the bases of transistors Q1 and Q2 respectively. Reset and set clock input terminals respectively identified as $R_{cl}$ and $S_{cl}$ are connected to the free ends of the first and second series branches, respectively. False and true output terminals respectively identified as $\overline{B}_1$ and $B_1$ are respectively connected to the collectors of transistors Q1 and Q2. When the flip-flop B1 is reset or false, transistor Q2 will be conducting and its collector will be at a low potential. Consequently, output terminals $\overline{B}_1$ and $B_1$ will be at high and low potentials respectively. Conversely, when transistor Q1 is conducting, output terminals $\overline{B}_1$ and $B_1$ will be at a low and high potential respectively and flip-flop B1 will be considered true. In the operation of flip-flop B1, the application of a negative clock signal to the input terminal $S_{cl}$ will cause the flip-flop B1 to assume a true state, regardless of which state it is in. Similarly, the application of a negative clock signal to the input terminal $R_{cl}$ will cause the flip-flop B1 to assume a false state and the simultaneous application of a clock signal to both input terminals $R_{cl}$ and $S_{cl}$ will cause the flip-flop to change state regardless of the state it is in. A sufficiently high positive potential applied to input terminal $S_{DC}$ will switch the flip-flop true and a sufficiently high potential applied to input terminal $R_{DC}$ will switch the flip-flop false.

The stages of the B counter are connected together to form a scale of twelve counter to successively define the states according to Table I in response to the clock pulses successively derived from the memory clock track and applied to the clock input terminals of flip-flop B1.

TABLE I

| | B4 | B3 | B2 | B1 |
|---|---|---|---|---|
| P0 | 0 | 0 | 0 | 1 |
| P1 | 0 | 0 | 1 | 0 |
| P2 | 0 | 0 | 1 | 1 |
| P3 | 0 | 1 | 0 | 0 |
| P4 | 0 | 1 | 0 | 1 |
| P5 | 0 | 1 | 1 | 0 |
| P6 | 0 | 1 | 1 | 1 |
| P7 | 1 | 0 | 0 | 0 |
| P8 | 1 | 0 | 1 | 1 |
| P9 | 1 | 1 | 0 | 1 |
| P10 | 1 | 1 | 1 | 0 |
| P11 | 1 | 1 | 1 | 1 |

Although the manner in which the B counter counts is somewhat arbitrary, the manner expressed by the above table was chosen because in its environment it proved to be the least expensive. The terms P0 through P11 respectively represent the various B counter states or bit periods. It is to be noted that set input signals are applied to stage B1 during states P0 and P9 and to stage B2 during state P8. Otherwise, the B counter counts in a standard binary fashion incrementing by one in response to each clock pulse. The B counter is implemented by connecting the true output terminal of each B counter flip-flop through an And gate 60 to the clock input terminals of a succeeding stage. In addition, the output of clock track output amplifier $Cl_0$ and the true output terminal of all other preceding B counter stages is connected to the input of each And gate 60. The signals P0 and P9 [developed as shown in FIGURE 3(*b*)] are applied to the set input terminal of flip-flop B1 through a pair of diodes. Signal P8 is similarly applied to flip-flop B2. The output of the reset circuit 16 is connected to the $R_{DC}$ input terminal of each of the flip-flops of the B counter for maintaining the B counter in synchronism with the rotation of the disc.

FIGURE 3(*b*) illustrates a plurality of significant gating signals derived from the B counter. These signals represent different bit periods in each digit period (i.e. the time it takes for a digit sector to move past a read head) and, as will be seen below, are utilized in the performance of several of the operations to be described. Initially, a signal P0 derived from the output of And gate 64 whose inputs respectively comprise the false output terminals of flip-flops B1, B2, B3, and B4 defines the initial bit period during each digit period. A signal P1 is derived from And gate 66 whose inputs respectively comprise the true output terminal of flip-flop B2 and the false output terminals of flip-flops B1, B3, and B4. Similarly, signals P2, P3, P9, P10, and P11 are derived from And gates 68, 69, 70, 72, and 74. A further signal $P_t$ which is true during bit periods 1 through 9 is developed by applying the false output terminals of flip-flops B2, B3, and B4 to the input of Or gate 76 and the output of gate 76 to the input of And gate 77 along with the output of an inverter to which is applied signal P0.

Figure 4:
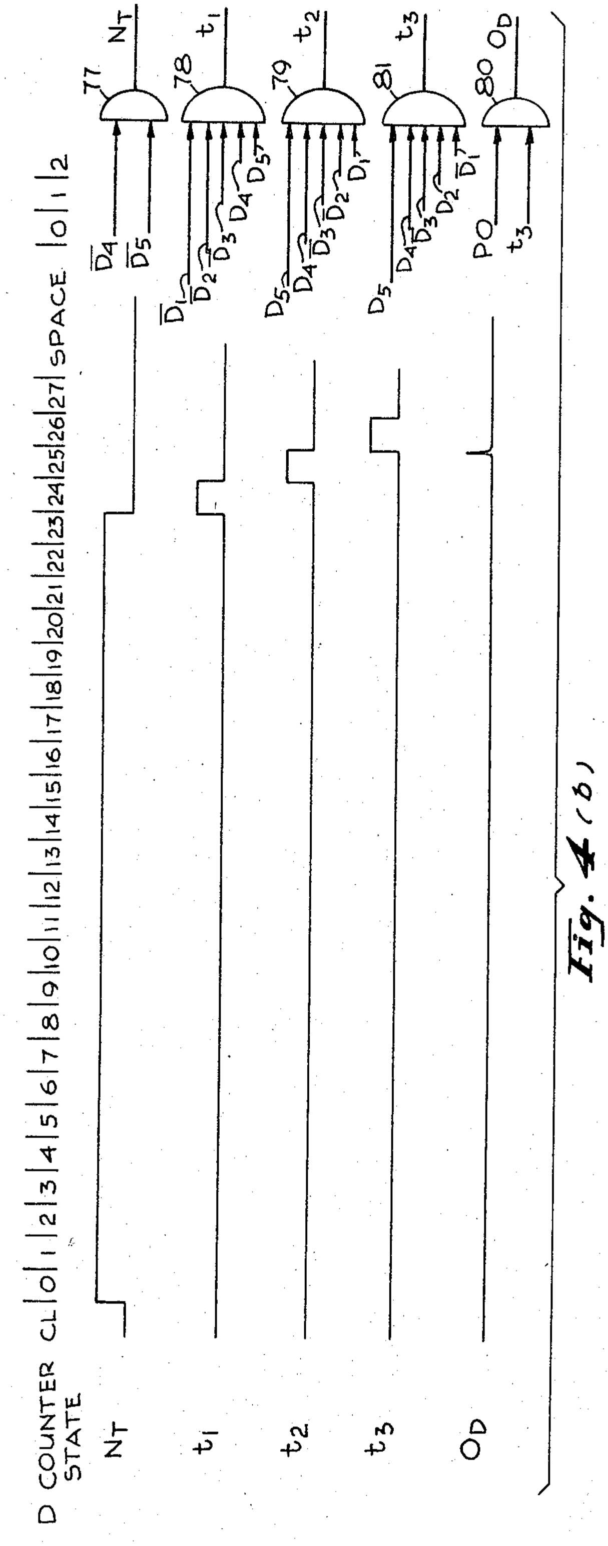
FIGURE 4(*a*) is a block schematic diagram of the digit (D) counter of FIGURE 1 and FIGURES 4(*b*) illustrates the gating means utilized to form the illustrated timing signals based upon the state of the D counter.
Figure 4:
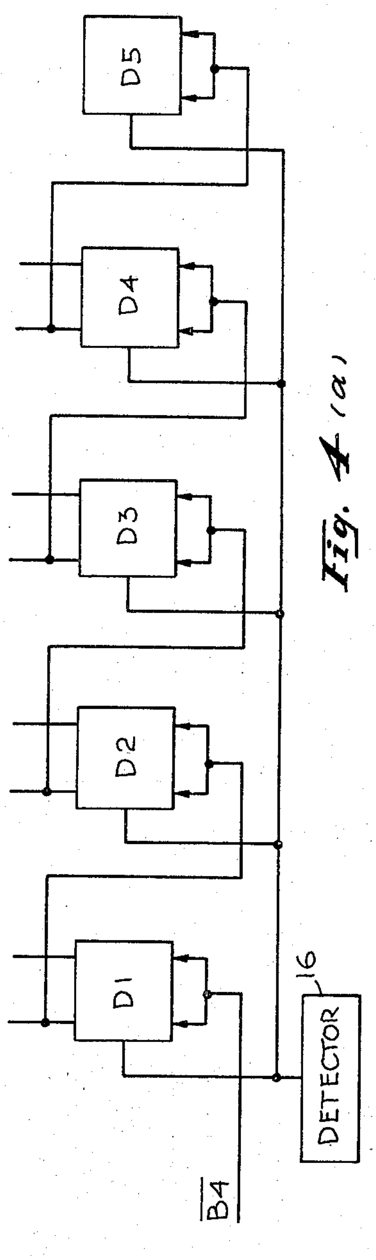

FIGURE 4(*a*) illustrates a block diagram of the D counter which consists of five stages, each stage including a flip-flop respectively identified as D1, D2, D3, D4, and D5. The external terminals of the D counter flip-flops correspond to the external terminals of the flip-flop B1 already discussed. The internal circuit of the D counter flip-flops can be substantially similar to the circuit illustrated for flip-flop B1. Table II below defines the D counter states.

TABLE II

| | D5 | D4 | D3 | D2 | D1 |
|---|---|---|---|---|---|
| 0 | 0 | 0 | 0 | 0 | 0 |
| 1 | 0 | 0 | 0 | 0 | 1 |
| 2 | 0 | 0 | 0 | 1 | 0 |
| 3 | 0 | 0 | 0 | 1 | 1 |
| 4 | 0 | 0 | 1 | 0 | 0 |
| 5 | 0 | 0 | 1 | 0 | 1 |
| 6 | 0 | 0 | 1 | 1 | 0 |
| 7 | 0 | 0 | 1 | 1 | 1 |
| 8 | 0 | 1 | 0 | 0 | 0 |
| 9 | 0 | 1 | 0 | 0 | 1 |
| 10 | 0 | 1 | 0 | 1 | 0 |
| 11 | 0 | 1 | 0 | 1 | 1 |
| 12 | 0 | 1 | 1 | 0 | 0 |
| 13 | 0 | 1 | 1 | 0 | 1 |
| 14 | 0 | 1 | 1 | 1 | 0 |
| 15 | 0 | 1 | 1 | 1 | 1 |
| 16 | 1 | 0 | 0 | 0 | 0 |
| 17 | 1 | 0 | 0 | 0 | 1 |
| 18 | 1 | 0 | 0 | 1 | 0 |
| 19 | 1 | 0 | 0 | 1 | 1 |
| 20 | 1 | 0 | 1 | 0 | 0 |
| 21 | 1 | 0 | 1 | 0 | 1 |
| 22 | 1 | 0 | 1 | 1 | 0 |
| 23 | 1 | 0 | 1 | 1 | 1 |
| 24 | 1 | 1 | 0 | 0 | 0 |
| 25 | 1 | 1 | 0 | 0 | 1 |
| 26 | 1 | 1 | 1 | 1 | 0 |
| 27 | 1 | 1 | 1 | 1 | 1 |
| Reset | 0 | 0 | 0 | 0 | 0 |

It will be noted that the D counter counts in straight binary fashion in response to transitions of flip-flop B4 of the B counter from a true to a false state. The D counter is periodically reset every 28 digit periods by the output of the reset circuit 16.

FIGURE 4(*b*) illustrates a plurality of gating signals derived from the states of the D counter. A signal $N_t$, representing the numeric portion of each memory cycle is developed by Of gate 77 whose inputs comprise the false output terminals of flip-flops D4 and D5. Signal $N_t$ is true during states 0 through 23 of the D counter. A signal $t_1$ which is true during state 24 of the D counter is developed by gate 78. Similarly, signals $t_2$ and $t_3$ are respectively developed by gates 79 and 81. In addition, a memory origin signal $O_d$ is developed by gate 80 by applying the signals P0 and $t_3$ to the input thereof.

The W counter 22 is utilized in conjunction with display device 14 for sequentially displaying the contents of the memory registers and for developing vertical deflection voltages to properly position the displayed contents. The W register is a scale of six counter consisting of three binary stages, each stage comprising a flip-flop whose circuit arrangement can be similar to that disclosed for flip-flop B1. Table III describes the states of the W counter.

TABLE III

| | W3 | W2 | W1 |
|---|---|---|---|
| State 0 | 0 | 0 | 1 |
| State 1 | 0 | 1 | 0 |
| State 2 | 0 | 1 | 1 |
| State 3 | 1 | 0 | 1 |
| State 4 | 1 | 1 | 0 |
| State 5 | 1 | 1 | 1 |
| State 0 | | | |

The first stage of the W counter is driven by true-to-false transitions of flip-flop D5 of the C counter. True-to-false transitions of flip-flop W1 are coupled to the clock input terminals of flip-flop W2. The false output terminal of flip-flop W2 is similarly connected to the clock input terminals of flip-flop W3 for normal binary counting. The true output terminal of flip-flop W2 is conected to the $S_{DC}$ input terminal of flip-flop W1. Consequently, when flip-flop D5 switches false and the W counter is in state 2, flip-flops W2 and W3 switch state but flip-flop W1 is forced back to the true state by the connection between the true output terminal of flip-flop W2 and the $S_{DC}$ input terminal of flip-flop W1. Similarly, when the W counter is in state 5, the true-to-false transition of flip-flop D5 will again cause flip-flops W1, W2, and W3 to change state but again W2 will force flip-flop W1 into a set condition.

Figure 6:
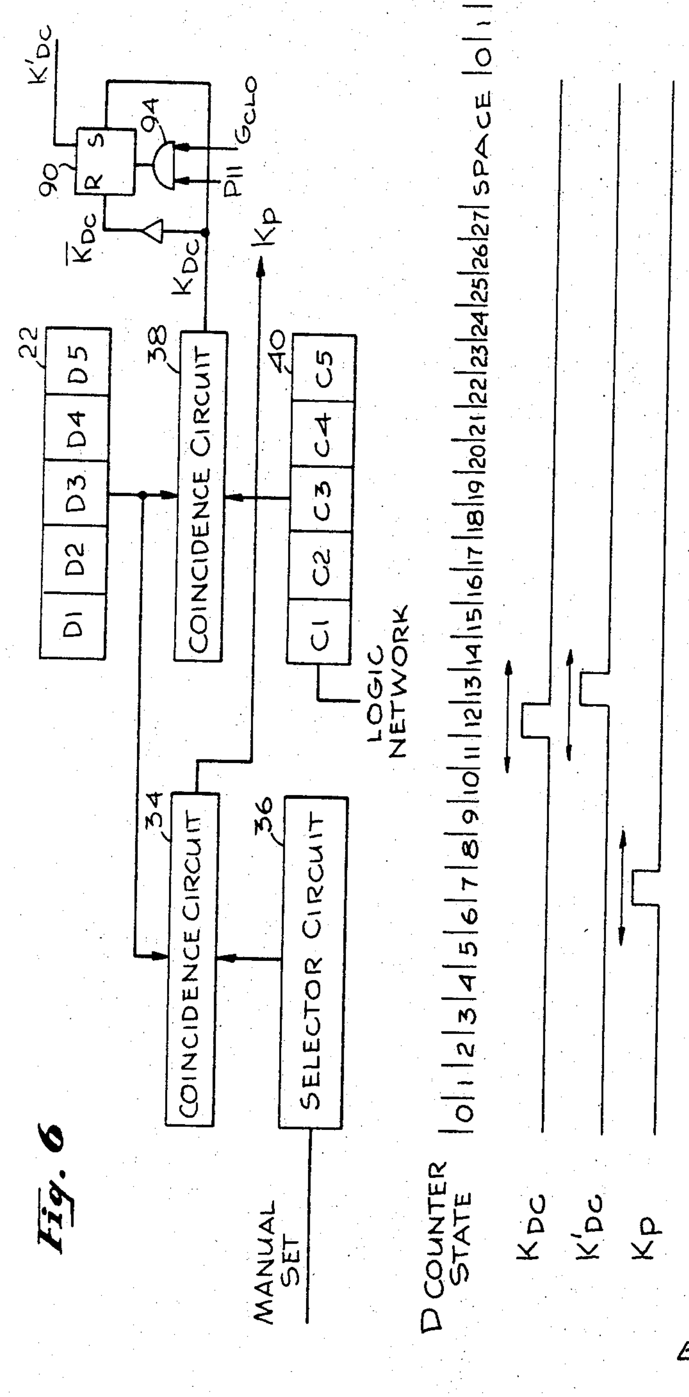
FIGURE 6 is a block diagram illustrating the means for deriving signals respectively representing coincidence between the D counter and the decimal point selector of FIGURE 1 and the D counter and the control (C) counter of FIGURE 1.

Attention is now called to FIGURE 6 which illustrates in greater detail the means for developing the previously-mentioned coincidence signals $K_p$ and $K_{DC}$ and a not-yet-introduced signal $K'_{DC}$ which represents the coincidence signal $K_{DC}$ delayed by one digit period. Each portion of the selector circuit 36 is manually settable to any even count between 0 and 23. Except when the preset function flip-flop is set, the coincidence circuit 34 continually compares the number represented by the decimal point selector portion of circuit 36 with the state of the D counter 22 which of course represents the position of the movable memory. When coincidence is sensed, the coincidence circuit 34 provides the coincidence signal $K_p$ which, as will be noted in the timing chart of FIGURE 6, is true for one digit period. When the preset function flip-flop is set, generation of the signal $K_p$ indicates coincidence between the D counter and the preset selector portion of circuit 36.

The C counter 40 is set by the logic network 42 and coincidence between the C counter 40 and D counted 22 is indicated by the provision of the signal $K_{DC}$ by the coincidence circuit 38. As noted in the timing chart of FIGURE 6, the coincidence signal $K_{DC}$ is true for one digit period during the initial 24 states of the D counter. In addition to the coincidence signals $K_p$ and $K_{DC}$, utilization will subsequently be made of the signal $K'_{DC}$ which constitutes the coincidence signal $K_{DC}$ delayed by one digit period. The signal $K'_{DC}$ is developed by applying the signal $K_{DC}$ directly to the set input terminal of a flip-flop 90 and through an inverter 92 to the reset input terminal thereof. The output of an And gate 94 is connected to the clock input terminals of the flip-flop with the inputs to the And gate 94 comprising the signal P11 and an odd gated clock signal $G_{C10}$ which will be discussed in further detail below but for the present, can be considered as occurring in synchronism with the clock pulses read off the memory clock track. The signal $K'_{DC}$ is derived from the true output terminal of the flip-flop 90. In operation, when the movable memory moves into a position such that the digit sector identified by the number stored in the C counter 40 moves under the heads associated with the output register amplifiers, the state of the D counter 22 will coincide with the state of the C counter 40 and as a consequence the coincidence circuit 38 will provide the coincidence signal $K_{DC}$. The flip-flop 90 will be set true in response to the development of the signal $K_{DC}$ and the subsequent generation of the signal P11. The flip-flop 90 will remain true for one digit period, i.e. until the subsequent generation of the signal P11 which of course will occur when signal $K_{CD}$ is false.

Figure 7:
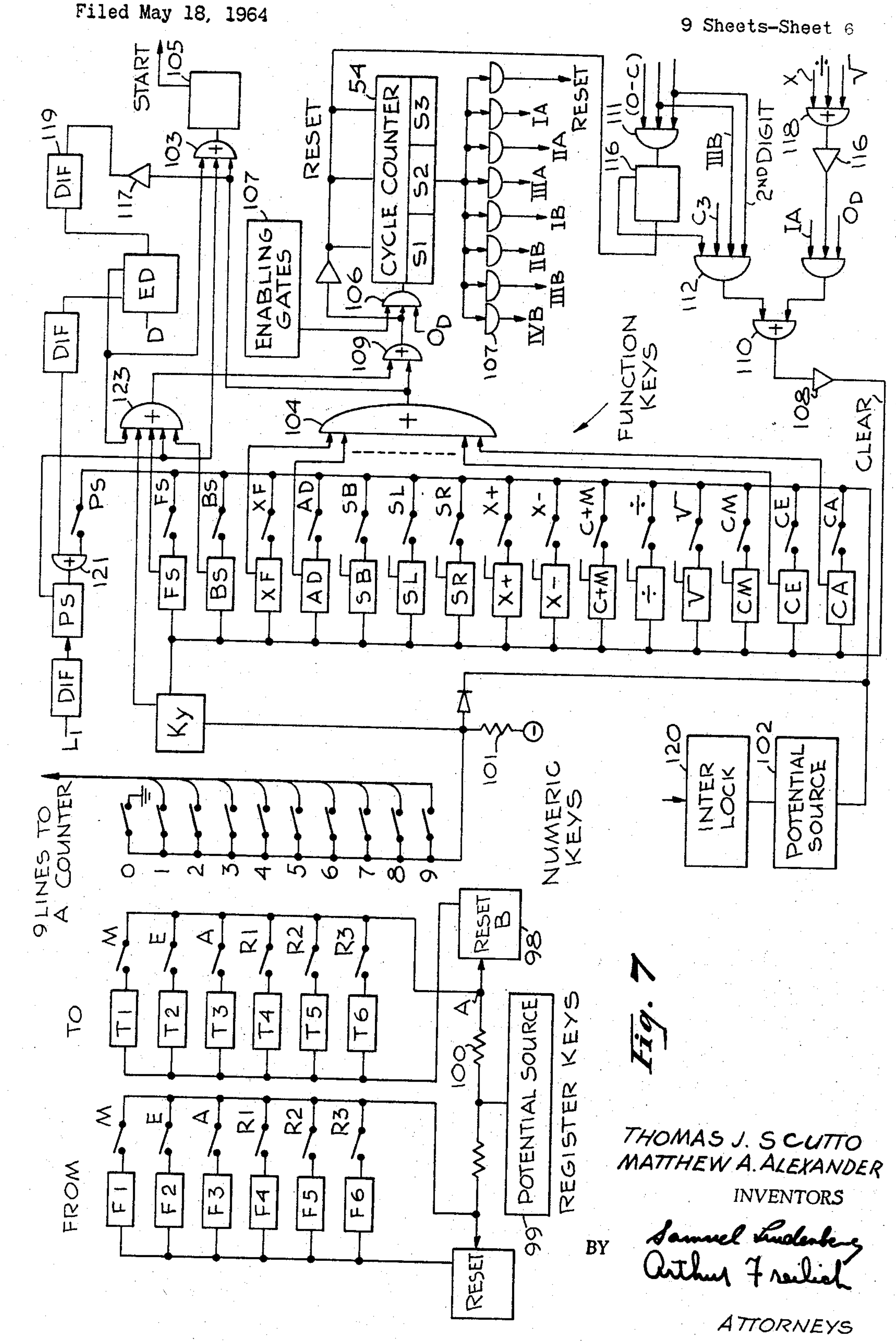
FIGURE 7 is a block schematic diagram illustrating both the flip-flops, which are set in response to the selective actuation of the keys on the calculator keyboard, and the cycle counter whose operation is initiated in response to the setting of any of the flip-flops in the set of function flip-flops.

Attention is now called to FIGURE 7 of the drawings which illustrates the various flip-flops set in response to the actuation of the keys introduced in FIGURE 1. The keys M, E, A, R1, R2, and R3 of the "from" subset of the register keys are respectively connected to the set input terminals of the flip-flops F1 through F6 respectively. Closure of any one of these keys connects the potential source 100 to the corresponding flip-flop causing it to be set. Similarly, the keys M, E, A, R1, R2, and R3 in the subset of "to" register keys are respectively connected to the set input terminals of the flip-flops T1 through T6 respectively. Energizing any one of the "to" switches sets the corresponding "to" flip-flop. The burst of energy used in setting the "to" flip-flop also generates a positive pulse at the input to reset circuit 98 connected to the potential source 99 through resistor 100 thereby resetting all the "to" flip-flops previously set. The "to" flip-flop being set remains set inasmuch as the setting pulse lasts longer than the resetting pulse. The "from" switches similarly set and reset the "from" flip-flops.

Each of the numeric keys 0 through 9 is connected to the appropriate input on the adder counter 44 and to the set input terminal of flip-flop key *Ky*, each number key serving to connect the potential source 102 to the adder counter in such a manner to cause it to be set to the state corresponding to the number of the key energized. The *Ky* flip-flop is set by detecting the positive pulse on the upper terminal of resistor 101.

Similarly, each of the function keys, upon actuation, connects the potential source 102 to a corresponding function flip-flop. For example, actuation of the add (AD) key causes the AD flip-flop to be set and actuation of the divide (÷) key causes the ÷ flip-flop to be set. The true output terminal of each of the function flip-flops, other than preset, forward space, backspace, edit, and *Ky* flip-flops, is connected to the input of an Or gate 104 whose output is connected through Or gate 103, to the reset input terminal of a delay multivibrator 105 which in turn provides a short duration "start" pulse. The output of gate 104 is also connected through Or gate 109 to the input of an And gate 106 along with the output of gate 80 of FIGURE 4(*b*) providing the origin signal $O_d$. The output of a group of enabling gates 107 is also connected to the input of gate 106. The output of gate 107 will be made true in response to different conditions during different operations and for different states of the cycle counter. The various conditions are defined in the discussion of each of the operations. The output of And gate 106 is connected to an enabling input of the cycle (S) counter 54 which is capable of defining a series of states as indicated by Table IV.

TABLE IV

| State | S3 | S2 | S1 |
|---|---|---|---|
| Reset | 0 | 0 | 0 |
| IA | 0 | 0 | 1 |
| IIA | 0 | 1 | 0 |
| IIIA | 0 | 1 | 1 |
| IB | 1 | 0 | 1 |
| IIB | 1 | 1 | 0 |
| IIIB | 1 | 1 | 1 |
| IVB | 1 | 0 | 0 |

The cycle counter is capable of successively defining the indicated states in response to various logical decisions made in the course of performing the several functions described below. Connected to the output of the cycle counter are eight And gate state detectors 107 each responsive to a different state to provide a true output signal.

The reset input terminal of each of the function flip-flops except the "preset" flip-flop, the edit flip-flop and the *Ky* flip-flop, is connected to a common clear line which is connected through an inverter 108 to the output of an Or gate 110. The inputs to the Or gates 110 are connected to the outputs of And gates 112 and 114. A first input to And gate 112 is derived from the true output terminal of flip-flop 116 which is set by the output of And gate 111. The inputs to gate 111 comprise the output of a circuit (not shown) which senses the zero state of the control counter 40 and provides a signal $O_c$ representative thereof, the output of state detector IIIB, and a signal derived from the D counter representing the second digit period during a memory cycle. A second input to the And gate 112 comprises the output of the state detector IIIB. A third input to And gate 112 comprises the signal representing the second digit period in a memory cycle. A fourth input to gate 112 comprises the true output terminal of flip-flop $C_3$ of the C counter.

The first input to And gate 114 is derived from a circuit (not shown) which provides a signal $O_d$ in response to the D counter defining a zero state. A second input to the And gate 114 is derived from state detector IA. The third input to And gate 114 is connected to the output of an inverter 116 whose output is connected to the output of an Or gate 118. The inputs to Or gate 118 respectively comprise the true output terminal of the multiply function flip-flop, the divide function flip-flop, and the square root function flip-flop. It has been indicated that the preset, edit, forward space, backspace, and *Ky* flip-flops are connected differently from the various other function flip-flops. These connections included connecting the output of gate 104 through an inverter 117 and differentiator circuit 119 to the set input terminal of the edit flip-flop whose output terminal is connected through a differentiator circuit to the input of an Or gate 121 along with the conductor connected through the preset key to the potential source 102. The output of Or gate 121 is connected to the set input terminal of the preset function flip-flop. The reset input terminal is connected through a differentiator circuit to the true output terminal of a logic flip-flop $L_1$ to be described. The edit flip-flop reset input terminal is connected to the output of an And gate whose input terminals will be considered in the course of discussing the edit operation.

The effect of coupling the output of gate 104 through the inverter 117 and differentiator 119 to the set input terminal of the edit flip-flop is to cause the edit flip-flop to be set after the completion of each operation other than forward space, backspace, numeric key, and preset. Completion of an operation is indicated by the generation of the clear signal from gate 110 which resets all function flip-flops other than the preset and edit function flip-flops. Resetting of the function flip-flops causes the output of gate 104 to change to thereby set the edit flip-flop if any of the function flip-flops other than FS, BS, *Ky*, or PS had been set. Setting of the edit flip-flop initiates an edit operation which when terminated, causes the preset flip-flop to be set and the preset operation to be initiated. It is desirable to initiate an edit operation after other operations, e.g. add, in order to cause the display apparatus to display only meaningful digits. It is subsequently desirable to initiate a preset operation in order to set the control counter to the state which will properly position the initial digit of a subsequent number to be entered.

The true output terminals of the preset, edit, forward space, backspace, and *Ky* flip-flops are all connected to the input of Or gate 123 whose output is connected to the input of Or gate 109. The output of Or gate 109 is connected to the reset input terminals of flip-flop 116 and the flip-flops of the cycle counter.

Connected to the potential source 102 is an interlock circuit 120 which permits actuation of only one of the function and Ky flip-flops at a time. The output of the interlock circuit is true when any of the aforementioned flip-flops is set and in this state controls the potential source 102 to effectively reduce the level provided thereby until the set flip-flop is reset so that the subsequent actuation of one of the numeric or function keys will have no effect while another flip-flop is set.

Figure 8:
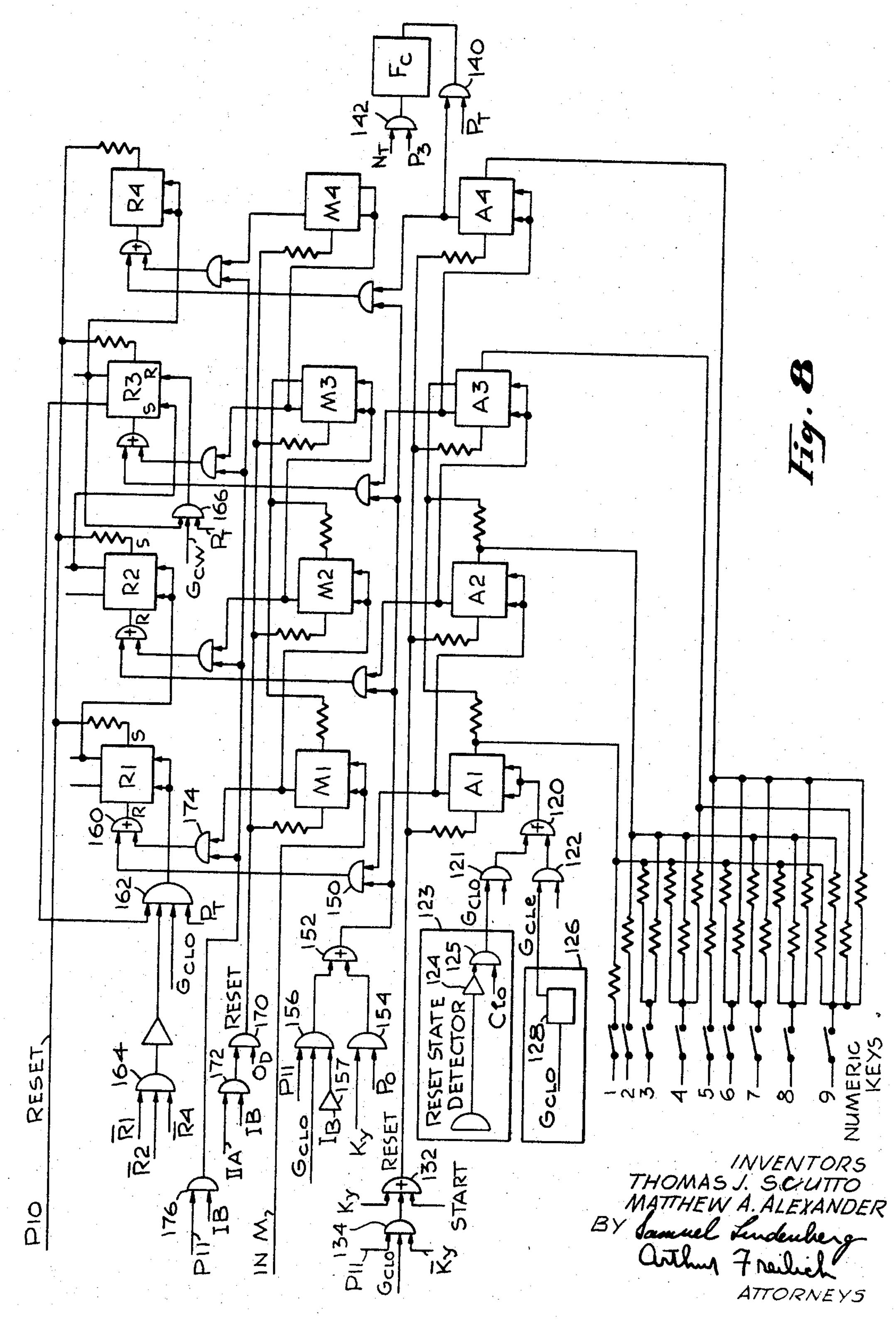
FIGURE 8 is a block schematic diagram of the R, M, and A decade counters of FIGURE 1 and the circuit interconnections therebetween.

Attention is now called to FIGURE 8 of the drawings which illustrates the previously referred to R, M, and A decade counters and the interconnections therebetween. Each of the decade counters consists of four flip-flop stages, the flip-flop circuits being substantially similar to the circuit of flip-flop B1. Connected by encoding resistors to the set input terminals of the A counter flip-flops are the numeric keys. In response to the actuation of any one of the numeric keys, the A counter flip-flops are set according to Table V.

TABLE V

| Count | A4 | A3 | A2 | A1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 1 | 1 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 1 | 1 |

Note for example that numeric key 1 is connected only to the set input terminal of flip-flop A1. Note that numeric key A3 is connected through resistors to the set input terminals of both flip-flop A1 and flip-flop A2. Note for example that numeric key 5 is connected through a resistor to the set input terminal of flip-flop A4 and that numeric key 8 is connected through resistors to the set input terminals of flip-flops A1, A2, and A4.

In addition to the A counter comprising a register which can be loaded by the numeric keys, it comprises a counter useful for performing arithmetic operations. The false output terminals of each of counter stages A1, A2, and A3 are respectively connected to the clock input terminals of stages A2, A3, and A4. The true output terminal of stage A3 is connected through a pair of resistors to the set input terminals of stages A1 and A2.

The output of an Or gate 120 is connected to the clock input terminals of stage A1. The two inputs to gate 120 are respectively derived from And gates 121 and 122. A first input to gate 121 is derived from a source 123 of odd gated clock signals $G_{C10}$. The source 123 includes the reset state detector which is connected through inverter 124 to the input of gate 125. The second input to gate 125 is derived from clock track output amplifier $C_{10}$. The second input to gate 121 is derived from different elements of the calculator apparatus during different operations. These operations are all discussed in detail in the aforecited U.S. patent application Ser. No. 314,387 and will not be treated in detail herein.

Connected to a first input of gate 122 is the output of a source 126 of even gated clock signals $G_{C1e}$. The source 126 includes a one shot multivibrator 128. Connected to the reset input terminal of the one shot multivibrator 128 is the output of gate 125. Application of the odd gated clock signal to the reset input terminal of the one shot multivibrator 128 causes it to momentarily shift to a false condition from which it will subsequently switch to a true condition a predetermined interval later. The transition of the multivibrator 128 to a true condition consitutes the even gated clock signal $G_{C1e}$. The delay of the one shot multivibrator is established such that a signal $G_{C1e}$ is developed in the middle of the period defined between successive signals $G_{C10}$. It should be apparent that the signals $G_{C10}$ are generated in synchronism with the pulse read from the memory clock track at all times other than when the cycle counter 54 is in a reset state. The second input to gate 122 is generally derived from the accumulator register output amplifier $A_0$ and will be discussed in greated detail below.

Connected to the reset input terminal of each of the flip-flops of the A counter is the output of an Or gate 132. A first input to the Or gate 132 comprises the true output terminal of the previously mentioned Ky flip-flop. A second input to the Or gate 132 is derived from the output of an And gate 134. A first input to the And gate 134 is derived from gate 74 developing the signal P11. The second input to the And gate 134 is derived from source 123 developing the signal $G_{C10}$ and the third input is connected to the false output terminal of the flip-flop KY. A third input to the Or gate 132 comprises a start signal derived from the multivibrator 105 (FIGURE 7).

A carry flip-flop $F_c$ is provided for the purpose of sensing a count greater than nine in the A counter. Connected to the set input terminal of the carry flip-flop is the output of an And gate 140. A first input to the And gate 140 comprises the false output terminal of flip-flop A4 and a second input thereto comprises the output of gate 76 of FIGURE 3(*b*) developing the signal $P_t$. Connected to the reset input terminal of the flip-flop $F_c$ is the output of an And gate 142. A first input to the And gate 142 comprises the output of gate 77 developing the signal $N_t$ and a second input thereto comprises the output of gate 69 developing the signal P3.

Whereas the A counter is an incrementing counter, the R counter is a decrementing counter. That is, instead of normally coupling transitions from one to zero from a less to a more significant stage, transitions from zero to one are coupled from each stage to the immediately more significant stage. Note that the true output terminals of flip-flops R1, R2, and R3 are coupled to the clock input terminal of the immediately more significant stage. A reset line connected to the output of the gate 72 in FIGURE 3(*b*) developing the signal P10 is connected to the set input terminal of each of the flip-flop stages of the R counter to permit resetting to force the R counter to an all "1's" state. Transfers from the A to the R register are effected through And gates 150. In order to transfer information directly from the incrementing A counter to the decrementing R counter without generating any carries in the R counter, transfers are effected when all the stages of the R counter are set to "1's" and "0's" are transferred in parallel. Transfer through the And gates 150 is effected by connecting the false output terminals of each of the A counter flip-flops to the input of a different one of the And gates 150. A second input to each of the And gates 150 is connected to the output of an Or gate 152. A first input to the Or gate 152 is derived from the output of an And gate 154. A first input to the And gate 154 is connected to the true output terminal of the flip-flop Ky and a second input to the And gate 154 is connected to the output of the gate 64 of FIGURE 3(*b*) developing the signal P0. A second input to the Or gate 152 is derived from the And gate 156. A first input to the And gate 156 is derived from the gate 74 of FIGURE 3(*b*) developing the signal P11. A second input to the And gate 156 is derived from source 123 developing the signal $G_{C10}$. A third input to the And gate 156 is derived from the IB state detector applied through inverter 157. That is, so long as the cycle counter is in a state other than IB, the third input to the And gate 156 will be true. The output of And gate 150 is connected to the input of an Or gate 160 whose output in turn is connected to the reset input terminal of an R counter flip-flop corresponding in position to the A counter flip-flop connected to the And gate 150 associated therewith.

Connected to the clock input terminals of flip-flop R1 is the output of And gate 162. The inputs to And gate 162 comprise the outputs of source 123 ($G_{C10}$), the output of gate 77 ($P_t$), the false output terminal of stage R3 and the inverted output of gate 64 which functions to indicate when the R counter defines state "0." The output of gate 166 is connected to reset clock input terminal of stage R3. Along with the output from source 123 and 77, the true output terminal of stage R3 is connected to the input of gate 166.

From what has been said of FIGURE 8 thus far, it should be apparent that numeric information can be entered into the A counter by virtue of the actuation of the numeric keys and in addition a count can be entered into the A counter by And gates 121 and 122 developing pulses which are applied to the clock input terminals of flip-flop A1. Whatever information is stored in the A counter is transferred through And gates 150, "0's" in parallel, to the R counter flip-flops at times determined by the input terms to the And gates 154 and 156. The signals applied through gates 162 and 166 to the clock input terminals of flip-flops R1 and R3 respectively cause the count in the R counter to be decremented. The R counter follows the same "State" table as the A counter, but in reverse. The clock inputs to the stage R1 are gated by the state of stage R3 such that R1 and thus R2 do not receive counts when R3 is true. The reset clock input terminal of stage R3 is connected to the output of gate 166 so that stage R3 will be reset on the next clock signal $G_{C10}$ after it comes true. After the R counter reaches zero, further counting is inhibited by gate 64.

The M counter is constructed similarly to the A counter and it defines the same states as shown in Table V. It is also an incrementing counter containing four flip-flop stages with the stage interconnections being the same as in the A counter. Connected to the clock input terminals of flip-flop M1 is a conductor identified in FIGURE 8 merely as "IN M." As was the case with the input signals applied to the clock input terminals of flip-flop A1, the input signals applied to the clock input terminals of flip-flop M1 are different during different operations of the calculator apparatus. Inasmuch as these operations are disclosed in detail and claimed in the aforecited U.S. patent application Ser. No. 314,387, they will not be treated in detail herein. The M counter reset is derived from the output of And gate 170. One input to And gate 170 comprises the output of gate 80 for developing the origin signal. A second input to the And gate 170 is developed by the Or gate 172 whose inputs respectively comprise the output of state detectors IA and IIA. Transfer between the M counter and the R counter is effected through And gates 174. Consequently, the false output terminals of the flip-flops M1, M2, M3, and M4 are each connected to the input of a different one of the And gates 174. A second input to each of the And gates 174 is derived from the output of And gates 176. A first input to And gate 176 is developed by the gate 74 of FIGURE 3(*b*) developing the signal P11. A second input to the And gate 176 is developed by the state detector IB. As was the case with transfers between the A counter and R counter, "0's" are transferred in parallel between the M counter and R counter.

In response to the actuation of any one of the numeric or function keys, appropriate operations are performed on the numbers stored in the registers. The details of these operations are discussed in the aforecited U.S. patent application Ser. No. 314,387. As noted, at the conclusion of each of these operations other than the preset, forward space, backspace, and key input operations, the edit flip-flop is set which initiates the performance of the edit operation.

Briefly, during the edit operation, the numbers in each of the six memory registers are examined in sequence to determine which digits therein are meaningful and which digits are not meaningful. As previously pointed out, any non-zero digit is considered a meaningful digit and all digits positioned between either the most significant digit and the decimal point or the least significant digit and the decimal point are considered meaningful. When there are non-zero digits to the right of the decimal point but none to the left of the decimal point, the first zero digit to the left of the decimal point is also considered meaningful. A pulse or tag bit is recorded in bit position P10 of all of the meaningful digits and the portion of the display apparatus shown in FIGURE 10 causes all of the meaningful digits to be displayed at normal illumination and all of the unmeaningful digits, that is the digits without a tag bit, at a dimmed illumination level. Thus, Table VI(*a*) below illustrates a typical display which would be presented if the numbers stored in the registers were not subjected to the edit operation. Table VI(*b*) illustrates the display presented subsequent to an editing operation performed on the numbers shown in Table VI(*a*).

TABLE VI(*a*)

| | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|
| (1) ---- | 0 | 0 | 0 | 0 | 0 | 0 | 0 | 0 | 0 | 0. | 0 | 0 | 0 | 0 | 0 | 0 | 0 | 0 | 0 | 0 | 0 | 0 |
| (2) ---- | 0 | 0 | 0 | 0 | 0 | 1 | 6 | 2 | 0 | 0. | 0 | 0 | 0 | 0 | 0 | 0 | 0 | 0 | 0 | 0 | 0 | 0 |
| (3) ---- | 0 | 0 | 0 | 0 | 0 | 0 | 0 | 0 | 0 | 0. | 0 | 0 | 0 | 1 | 2 | 9 | 0 | 0 | 0 | 0 | 0 | 0 |
| (4) ---- | 0 | 0 | 1 | 0 | 0 | 0 | 0 | 0 | 0 | 0. | 0 | 0 | 0 | 0 | 0 | 0 | 0 | 0 | 0 | 0 | 0 | 0 |
| (5) ---- | 0 | 0 | 0 | 0 | 0 | 0 | 0 | 0 | 0 | 0. | 0 | 0 | 0 | 0 | 0 | 2 | 0 | 0 | 0 | 0 | 0 | 0 |
| (6) ---- | 0 | 0 | 0 | 0 | 0 | 0 | 0 | 1 | 3 | 0. | 0 | 0 | 0 | 0 | 1 | 6 | 0 | 0 | 0 | 0 | 0 | 0 |

TABLE VI(*b*)

| | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|
| (1) ---- | | | | | | | | | | . | | | | | | | | | | | | |
| (2) ---- | | | | | | 1 | 6 | 2 | 0 | 0. | | | | | | | | | | | | |
| (3) ---- | | | | | | | | | | 0. | 0 | 0 | 0 | 1 | 2 | 9 | | | | | | |
| (4) ---- | | | 1 | 0 | 0 | 0 | 0 | 0 | 0 | 0. | | | | | | | | | | | | |
| (5) ---- | | | | | | | | | | 0. | 0 | 0 | 0 | 0 | 0 | 2 | | | | | | |
| (6) ---- | | | | | | | | 1 | 3 | 0. | 0 | 0 | 0 | 0 | 1 | 6 | | | | | | |

Figure 9A:
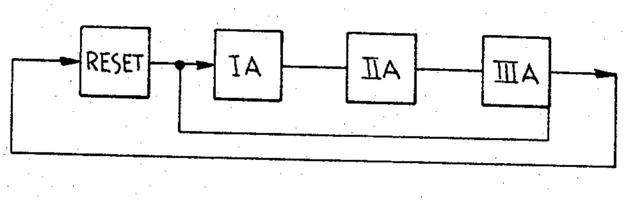
FIGURE 9(*a*) is a flow diagram illustrating the sequence of cycle (S) counter states utilized in the performance of the edit operation and FIGURES 9(*b*)–(*e*) illustrate the portions of the calculator apparatus active in each of these states.
Figure 9B:
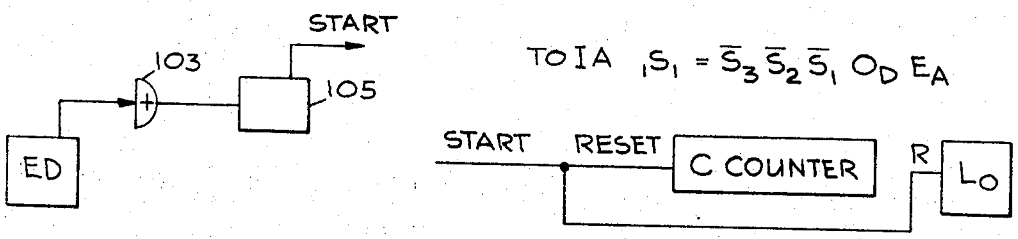
Figure 9C:
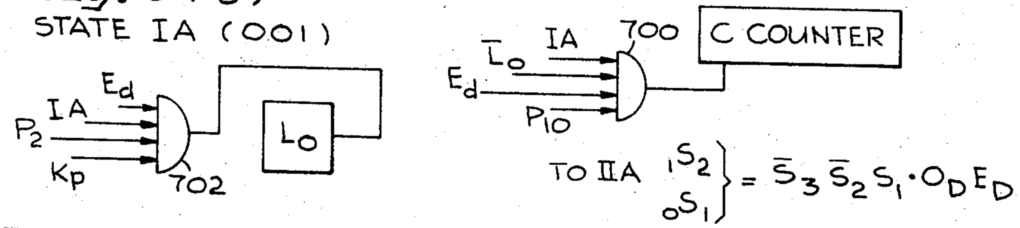
Figure 9D:
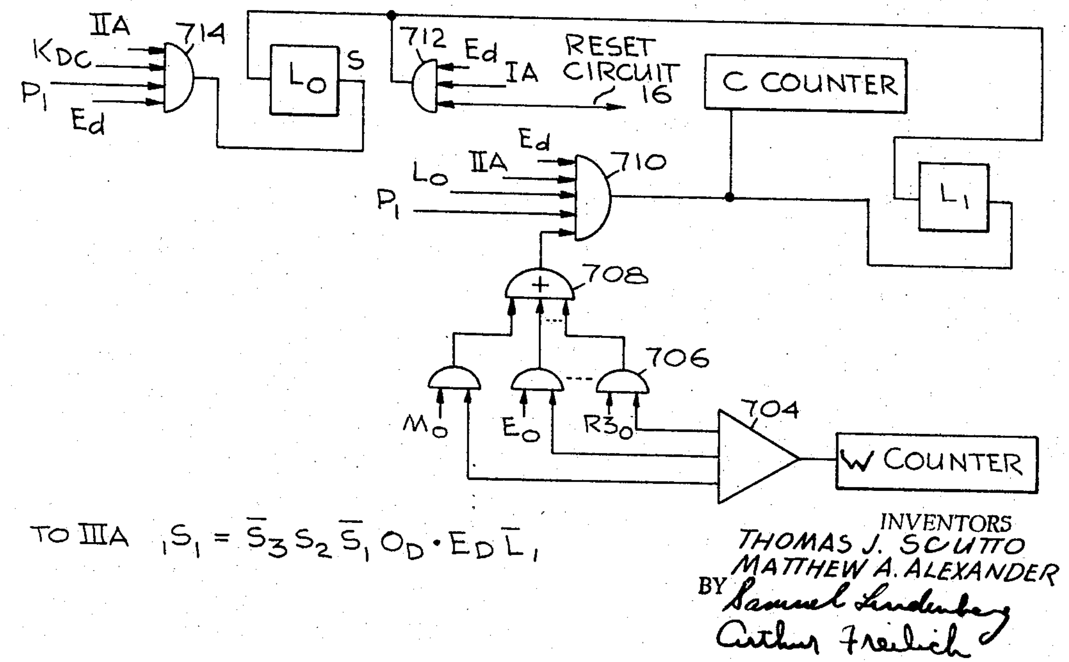
Figure 9:
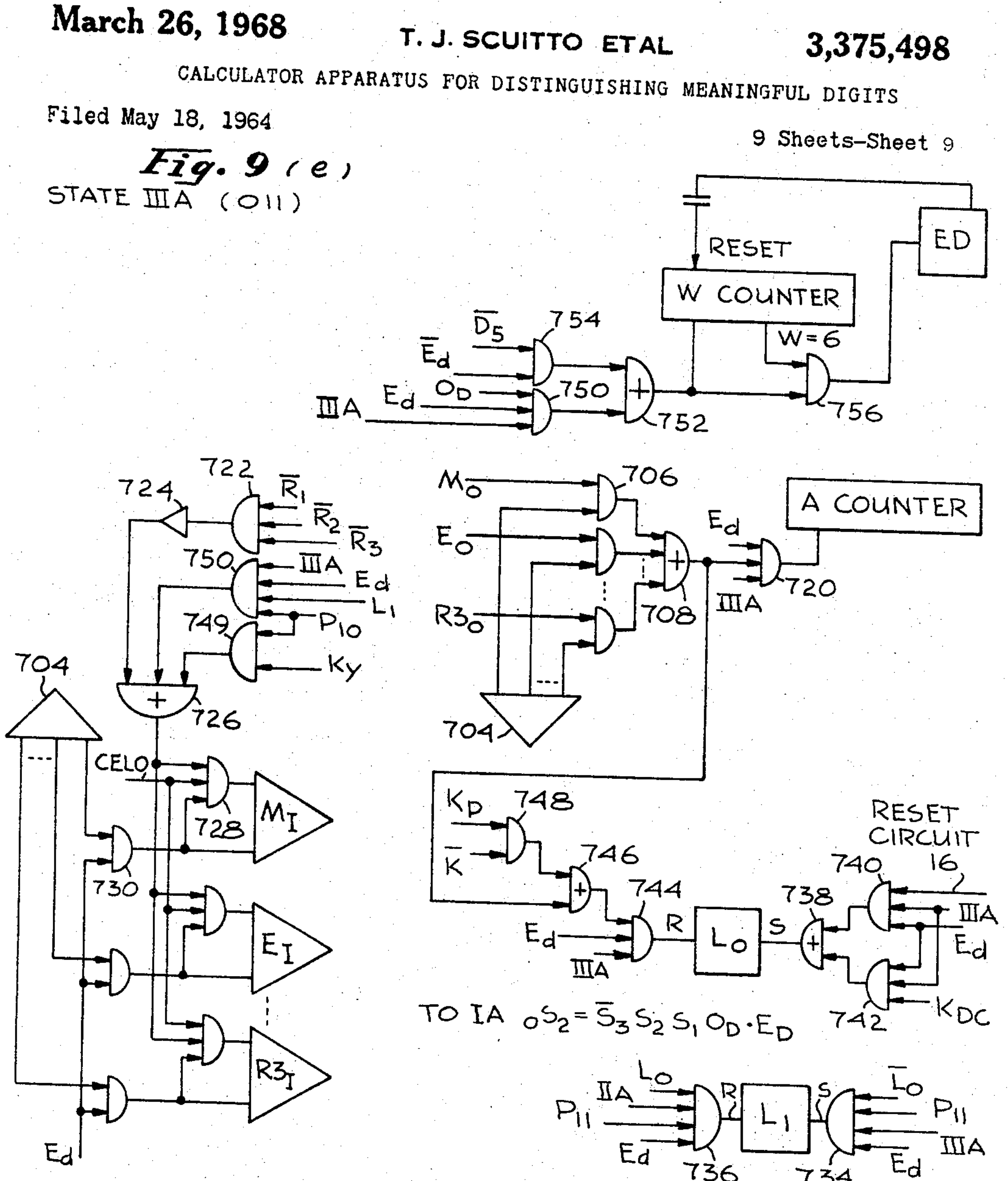

Attention is now called to FIGURE 9 which illustrates the portions of the calculator apparatus utilized to perform the edit operation. FIGURE 9(*a*) is a flow diagram showing the various states defined by the cycle counter in the course of performing the edit operation. Initially, the cycle counter is in the reset state. In response to the edit flip-flop being set, the cycle counter is permitted to switch to state IA. During state IA, the control counter is preset to the number equivalent to the decimal point selector setting. This action requires only one cycle of the disc memory and subsequently, the cycle counter defines state IIA. During state IIA, the control counter is advanced one count for each non-zero digit following the signal $K_{DC}$, i.e. coincidence between the digit counter and the control counter. Consequently, the count finally defined by the control counter designates the digit sector containing the most significant digit of the register being edited. State IIIA is defined after state IIA. During state IIIA, a tag bit is recorded in bit position P10 in each digit sector starting with the first non-zero digit if occurring prior to signal $K_p$, i.e. the signal representing coincidence between the digit counter and the decimal point selector circuit. If no non-zero digit is recognized before the signal $K_p$ is encountered, then the recording of tag bits is initiated in response to the signal $K_p$, unless the signal $K_{DC}$ occurs simultaneously with the signal $K_p$ and a zero digit is provided by the register being edited. In response to the signal $K'_{DC}$ which is generated one digit period after signal $K_{DC}$ is developed, recording of the tag bits is stopped. The W counter is then incremented to cause a subsequent register to be edited unless the W counter already defines its highest state meaning that all of the registers have already been edited. If the W counter defines its highest state, then the cycle counter is reset and the edit flip-flop is reset which in turn initiates the preset operation.

FIGURE 9(*b*) illustrates the portions of the calculator apparatus active during the reset state of the cycle counter. In response to the setting of the edit flip-flop caused indirectly by the generation of the clear signal by inverter 110 of FIGURE 7, the previously mentioned multivibrator 105 is momentarily reset to thereby generate a start signal which is applied to both the control counter and the logic flip-flop $L_0$ to affect the resetting thereof. Setting of the edit flip-flop also causes the gate 109 of FIGURE 7 to provide an appropriate signal through gate 106 to the cycle counter to cause the cycle counter to switch from a reset state to state IA.

The terms ${}_1S_1$ and ${}_0S_1$ shall be respectively used in the logical equations hereinafter set forth to refer to the development of set and reset input signals to flip-flop S1. Consequently, the logical equation presented in FIGURE 9(*b*) denotes that when the cycle counter is in the reset state, a set input signal will be applied to flip-flop S1 in response to the generation of the origin signal $O_d$ when the edit flip-flop is set.

In state IA [FIGURE 9(*c*)], the C counter is incremented during bit period P10 during each digit period prior to the signal $K_p$ being generated. That is, gate 700 will provide a pulse to the incrementing input terminal of the C counter every bit period P10 during state IA for so long as the logic flip-flop $L_0$, reset during the reset state, remains false. The logic flip-flop $L_0$ will be set in response to the And gate 702 applying a signal to the set input terminal thereof. Gate 702 will provide such a signal during bit period P2 in the digit period in which signal $K_p$ is generated. Thus, during state IA the C counter will be incremented from a zero count to a count equal to the setting of the decimal point selector circuit. When the origin signal $O_d$ is then generated, the cycle counter will be switched to state IIA.

During state IIA [FIGURE 9(*d*)], the C counter is incremented to a count equal to the digit position containing the most significant digit in the register being considered. The state of the W counter determines which register is to be considered. Thus, the output of the W counter is applied to the input of a decoding circuit 704 which is provided with six output terminals, each of which is connected to the input of a different And gate 706. The second input of each of the And gates 706 is derived from a different one of the register output amplifiers. The outputs of all of the gates 706 are connected to the input of an Or gate 708 whose output is connected to the input of an And gate 710. The true output terminal of the edit flip-flop and the output of state detector IIA are also connected to the input of And gate 710 whose output is connected to the incremening input terminal of the C counter. In addition, the true output terminal of logic flip-flop $L_0$ and the output of gate 66 of FIGURE 3(*b*) providing signal P1, are also connected to the input of gate 710.

Logic flip-flop $L_0$ is reset at the beginning of the state IIA through And gate 712 by the output of the reset circuit 16 of FIGURE 1. The logic flip-flop $L_0$ is subsequently set during the bit period P11 in the digit period in which the signal $K_{DC}$ identifying coincidence between the C and D counters is generated. If any non-zero digit exists in the register being considered in a digit position to the left of the decimal point setting, the output amplifier associated with that register will provide a signal, through gate 708, to the input of gate 710 during bit period P1 in a digit period subsequent to the digit period in which signal $K_{DC}$ is developed. As a consequence, gate 710 will provide a signal to the incrementing input terminal of the C counter and in addition will set a logic flip-flop L1. The logic flip-flop L1 is reset through And gate 712 at the same time as $L_0$ following the origin signal $O_d$. If the logic flip-flop L1 is set when the signal $O_d$ is generated, the cycle counter will remain in state IIA to thus permit the C counter to be incremented by one count during the subsequent disc cycle if still another non-zero digit exists to the left of the digit position defined by the C counter. Only when the count in the C counter defines the digit position containing the most significant digit in the register, will the logic flip-flop L1 be false when the origin signal is developed. When this condition is encountered, as is expressed by the logical equation in FIGURE 9(*c*), the cycle counter will switch to state IIIA.

During state IIIA [FIGURE 9(*e*)], tag bits are recorded in bit positions P10 starting with thee first non-zero digit if it occurs before the generation of the signal $K_p$, that is to the right of decimal point position. For example, see lines 3, 5, and 6 of Table VI(*b*). If no non-zero digit exists to the right of the decimal point, tag bits are recorded starting with the decimal point, i.e., the signal $K_p$ [see lines 2 and 4 of Table VI(*b*)] unless the signals $K_{DC}$ and $K_p$ occur simultaneously and the digit provided by the register at this time is equal to zero [see line 1 of Table VI(*b*)].

It will be recalled that an appropriate number of pulses to represent a desired digit can be recorded in a register by entering that count into the R counter and permitting the R counter to be decremented while clock pulses are applied to the register input amplifier so long as the R counter does not define a zero count. In order to enter tag bits into bit position P10 of the desired digit sectors, the same gate which is controlled by the R counter when digits are normally written into the registers, is used to enter the tag bit. Thus, in recording the tag bits, initially each digit is accessed from the register and entered into the A counter through gate 720. An input to the gate 720 is derived from the previously mentioned Or gate 708 which, as noted, passes the output of a selected register output amplifier, the particular output amplifier being selected by the decoder circuit 704 which is responsive to the count in the W counter. The contents of the A counter are subsequently transferred to the R counter and so long as the R counter does not define a zero count, And gate 722 will not provide a true output signal. The output of And gate 722 is connected through an inverter 724 to the input of Or gate 726 whose output is connected to the input of each of the And gates 728. The output of each gate 728 is connected to the upper input terminal of a different one of the register input amplifiers. The clock signal $G_{C10}$ is also connected to each of the gates 728. Each gate 728 is enabled by the output of a different gate 730 whose output is also connected to the lower enabling input of a different one of the register input amplifiers. The particular gate 730 which is enabled is determined by the output of the decoder circuit 704 which is responsive to the count in the W counter. Thus, digits which are accessed from a selected register and entered into the A counter are written back into the register, via the R counter which, so long as it does not store a zero, causes a true input signal to be applied to gates 728.

Tag bits are recorded during bit periods P10 in the performance of the edit operation during state IIIA whenever the logic flip-flop L1 is true thereby causing the output of gate 732 to be true. The output of gate 732 is connected to the input of Or gate 726. Logic flip-flop L1 can be set in response to And gate 734 providing an output signal and can be reset in response to And gate 736 providing an output signal. Gate 734 will provide an output signal when the logic flip-flop $L_0$ is in a reset state during a bit period P11. On the other hand, logic flip-flop L1 is reset when the logic flip-flop $L_0$ is in a set state during bit period P11. The logic flip-flop $L_0$ is set by a pulse provided by Or gate 738 derived from the output of either And gate 740 or 742. And gate 740 provides a setting pulse at the beginning of state IIIA inasmuch as the output of reset circuit 16 of FIGURE 1 is connected to the input of And gate 740. And gate 742 will provide a setting pulse in response to the development of the signal $K'_{DC}$ which it will be recalled, is generated during the digit period immediately following the digit period in which the most significant digit is read. The logic flip-flop $L_0$ is reset, to in effect cause tag bits to be recorded, when the output of And gate 744 is made true. The enabling input to And gate 744 is derived from Or gate 746. A first input to Or gate 746 is derived from the output of Or gate 708. Thus, whenever a non-zero digit is read out the particular register output amplifier designated by the state of the W counter and through a gate 706, the logic flip-flop $L_0$ will be reset, thereby setting the logic flip-flop L1 thereby causing tag bits to be recorded in bit position P10 of all of the succeeding digit sectors until the signal $K'_{DC}$ is generated which indicates that the digit sector containing the most significant digit has passed the writing amplifier.

A second input to the Or gate 746 is derived from the output of And gate 748 which provides an output signal in response to signal $K_p$ being developed when signal $K_{DC}$ is not developed simultaneously therewith. It should be appreciated that gate 748 thus serves the purpose of causing tag bits to be entered into zero digits to the left of the decimal point which are to the right of an existing non-zero digit.

The output of And gate 749, whose inputs are derived from the true output terminal of the *Ky* flip-flop and gate 72 of FIGURE 3(*b*) providing signal P10, is also connected to the input of Or gate 726. Thus, whenever a digit is entered into the memory via the keyboard, a tag bit is always introduced therewith.

At the end of state IIIA, in response to the origin signal $O_d$, And gate 750 will provide a signal through Or gate 752 which increments the W counter. Gate 754 provides the normal incrementing signal through gate 752 to the W counter when the edit operation is not being performed. FIGURE 9(*e*) illustrates the true output terminal of the edit flip-flop being connected to the reset input terminal of the W counter through a capacitor. Thus, whenever the edit flip-flop is set, the W counter is reset. Then, in each state IIIA, the W counter is incremented to successively cause each of the registers to be edited. When the W counter defines its highest state indicating that all of the registers have been edited, an enabling signal is provided to And gate 756. When And gate 750 subsequently develops an incrementing signal at the end of state IIIA, gate 756 will apply a signal to the reset input terminal of the edit flip-flop to terminate the edit operation.

Figure 10:
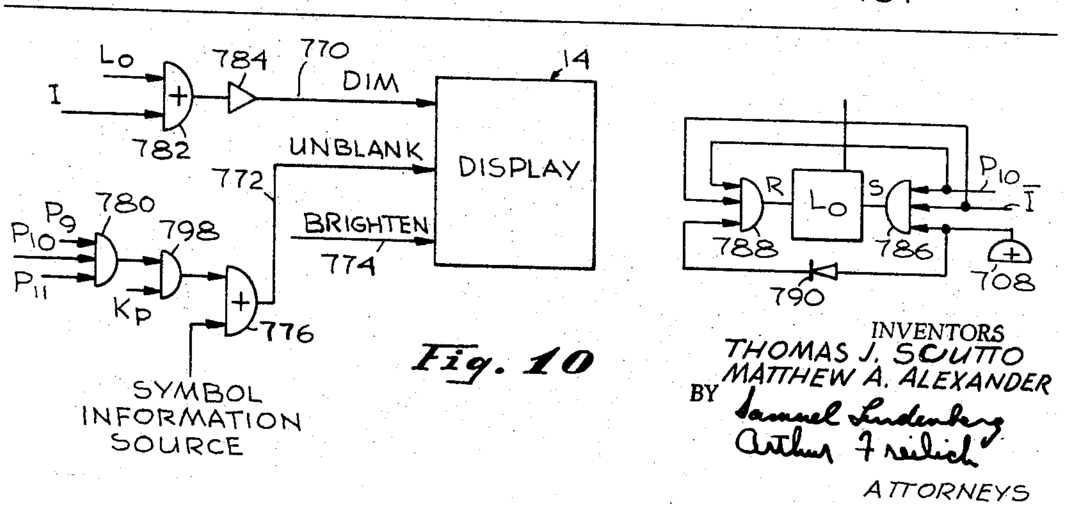
FIGURE 10 is a block diagram of the portions of the display apparatus responsive to the tag bits for dimming unmeaningful digits.

Attention is now called to FIGURE 10 which comprises a block diagram of the portions of the display apparatus responsive to the tag bits identifying meaningful digits stored in the registers. The tag bits, of course, comprise a pulse in bit position P10 of each digit sector storing a meaningful digit and of course could have been introduced into the digit sector by either the editing operation or by the operator entering the digit via the keyboard. The display apparatus 14, which can comprise a cathode ray tube type display device, is provided with at least three beam control terminals 770, 772, and 774. When a true signal is applied to control terminal 770, the intensity of the beam is reduced so that any symbol drawn while terminal 770 is true, will appear at a dimmed illumination level. When a true signal is applied to control terminal 772, the beam is unblanked, the beam normally being blanked. A true signal applied to control terminal 774 will operate to brighten any symbol drawn while that terminal is true. Inasmuch as the terminal 774 is not utilized in the preferred embodiment of the present invention, nothing further will be said about it.

The output of Or gate 776 is connected to the control terminal 772. A first input to the Or gate 776 is derived from a symbol information source which appropriately causes the beam to be blanked or unblanked for short periods of time depending upon the symbol being displayed. A detailed consideration of the means exercising control over the beam in order to display various symbols is disclosed in U.S. patent application Ser. No. 330,843, filed Dec. 16, 1963, and assigned to the same assignee as the present application.

A second input to Or gate 776 is derived from the output of And gate 778. A first input to And gate 778 comprises the output of coincidence circuit 34 providing signal $K_p$. A second input to And gate 778 comprises the output of Or gate 780 whose inputs are derived from gates 72 and 74 of FIGURE 3(*b*) respectively providing signals P10 and P11. Consequently, the display beam is unblanked in response to information provided by the symbol information source and during bit periods P10 and P11 when signal $K_p$ is developed to thereby display the decimal point.

The displayed symbols are dimmed at all times except when the output of Or gate 782 applied through inverter circuit 784 to the control terminal 770, is true. Connected to the input of Or gate 782 is the true output terminal of logic flip-flop $L_0$ and the output of the aforementioned interlock circuit 120 of FIGURE 7. It will be recalled that the interlock circuit 120 provides a true output signal whenever any operation is in process. This true output signal I makes the output of Or gate 782 true whenever any calculator operation is being performed in response to any of the function flip-flops being set. As noted, when the output of Or gate 782 is true, none of the displayed symbols are dimmed. Thus, a fully illuminated display is presented during the course of performing operations, a typical full display being represented by Table VI (*a*) set forth previously. When no calculator operation is being performed however, the output of the interlock circuit will be false and thus will not prevent the displayed symbols from being dimmed. Thus, all displayed symbols will be dimmed except those displayed when logic flip-flop $L_0$ will be set true in response to pulses being read from the memory during bit periods P10 when no calculator operation is being performed.

Connected to the set and reset input terminals of the logic flip-flop $L_0$ are And gates 786 and 788 respectively. The output of gate 72 of FIGURE 3(*b*) providing signal P10 is connected to the inputs of both And gates 786 and 788. Similarly, the inverted output signal of the interlock circuit 120 is connected to the inputs of both And gates 786 and 788. The output of previously mentioned Or gate 708 which passes the pulses read from the particular track defined by the state of the W counter, is connected directly to the input of And gate 786 through an inverter 790 to the input of And gate 788. Thus, whenever a meaningful digit is accessed from the memory, the logic flip-flop $L_0$ will be set in period P10 thereof in response to an output signal being provided by the And gate 786. With the logic flip-flop $L_0$ defining a set state, and with the interlock circuit 120 defining a false state, the output of Or gate 782 will be true and thus a false signal will be applied to the terminal 770 of the display apparatus 14. Consequently, symbols displayed while the logic flip-flop $L_0$ is true, will not be dimmed and will appear at a higher illumination level, as for example illustrated by Table VI(*b*) set forth previously.

Figure 11:
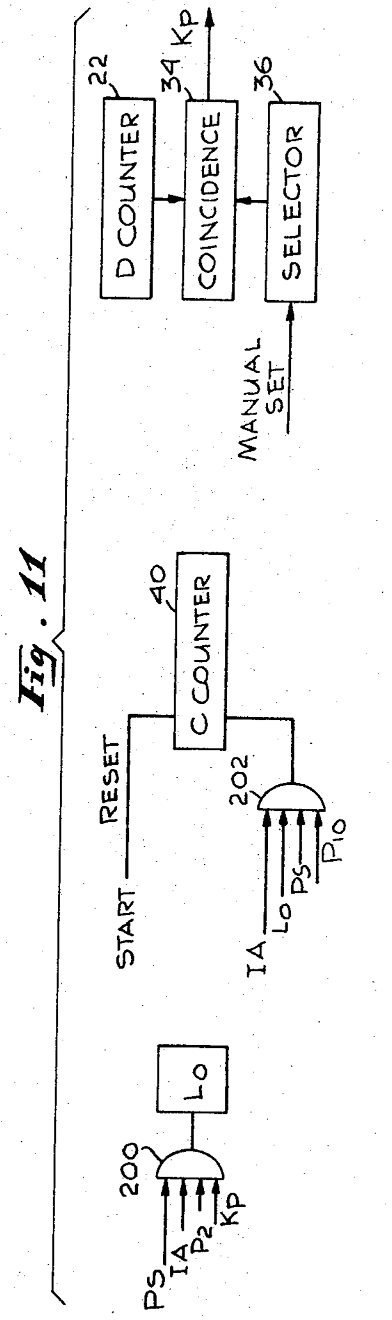
FIGURE 11 is a block schematic diagram illustrating the portions of the calculator apparatus responsive to the actuation of the "preset" key for setting the control (C) counter.

Attention is now called to FIGURE 11 which illustrates the portion of the calculator apparatus utilized to preset the control counter 40 to a desired state. For this purpose, the logic flip-flop $L_0$ and an And gate 800 whose output is coupled to the reset input terminal of the flip-flop $L_0$, are utilized. Both the flip-flop $L_0$ and the gate 800 form part of the logic network 42 of FIGURE 1. In order to preset the control counter 40 to a desired state, the preset function flip-flop is set and it will be recalled this is done automatically at the termination of the edit operation through the differentiator circuit between the edit flip-flop output terminal and the Or gate 121. The setting of the preset function flip-flop causes Or gate 103 to provide a true output signal which in turn generates a start signal thereby resetting the control counter 40. The true output signal provided by the Or gate 123 causes the cycle counter 54, upon the generation of the next origin signal $O_d$, to switch from the reset state to state IA. State detector IA is connected to the input of And gate 802 whose output is connected to the clock input terminals of the least significant stage of the control counter 40. In addition, the true output terminal of the logic flip-flop $L_0$ is connected to the input of the And gate 802.

Further, the true output terminal of preset function flip-flop is connected to the input of the And gate 802 along with the ouput of gate 72 of FIGURE 3(*b*) providing signal P10. Consequently, during each digit period after the generation of the origin signal, the control counter 40 will be incremented by one count. The incrementing of the control counter 40 will continue so long as the logic flip-flop remains true. The logic flip-flop will be reset when And gate 800 provides a true signal to its reset input terminal. A first input to the And gate 800 is derived from the true output terminal of the preset function flip-flop. A second input to the And gate 800 is derived from the state detector IA, a third from And gate 68 which develops signal P2, and a fourth input from the coincidence circuit 34 which develops coincidence signal $K_p$ indicating coincidence between the state of the D counter 22 and the preset selector portion of the selector circuit 36.

In summary therefore, in response to the preset flip-flop being set, the control counter 40 will initially be reset and then will subsequently count up in synchronism with the D counter 22. When coincidence between the D counter 22 and the preset selector portion of circuit 36 is recognized, the application of incrementing signals to the control counter will be terminated leaving the counter in a state equal to that defined by the preset selector portion of circuit 36.

From the foregoing, it should be appreciated that an apparatus has been disclosed herein for examining digits of numbers stored in a calculator memory and for determining whether each non-zero digit is in fact meaningful. Subsequently, in order to facilitate the operator's comprehension of an output display, zero digits which are not meaningful, are tagged so that the display apparatus can respond thereto by visually distinguishing, for the operator, those unmeaningful digits from those digits which are meaningful. It is pointed out that although the rules disclosed herein for distinguishing meaningful digits from unmeaningful digits probably provide the most convenient output displays, it is recognized that other more arbitrary rules might prove useful in some situations and it should be appreciated that an embodiment of the invention can be modified to utilize such rules.

What is claimed is:

1. Calculator apparatus comprising:
memory means including a plurality of number storing registers, each register including a plurality of ordered digit sectors, each digit sector including several information bit positions and at least one control bit position;
means for storing a digit in each digit sector by recording a pulse in each of a number of information bit positions equal to the value of the digit being stored;
display means for presenting a visual display of said stored numbers;
edit means for examining each of said stored numbers for determining which digits thereof are meaningful and which digits thereof are not meaningful;
means in said edit means for recording a tag bit in said control bit position of each of said meaningful digits; and
means in said display means responsive to each of said tag bits for modifying the visual presentation of the digits stored in the digit sector storing said tag bit.

2. The apparatus of claim 1 wherein said display means includes a cathode ray tube and wherein said means in said display means modifies the illumination level of said cathode ray tube.

3. The apparatus of claim 1 wherein said means for storing said digits includes a plurality of manually actuatable keys; and
means responsive to the actuation of each of said keys for recording a different number of pulses and to the actuation of any one of said keys for recording a tag bit.

4. Calculator apparatus comprising:
memory means including a plurality of number storing registers, each register including a plurality of ordered digit sectors, each digit sector including several information bit positions and at least one control bit position;
means for storing a digit in each digit sector by recording a pulse in each of a number of information bit positions equal to the value of the digit being stored;
display means for presenting a visual display of said stored numbers;
means for defining a decimal point position;
means for recording a tag bit in the control bit position of digit sectors having any pulses recorded in the information bit positions thereof and in digit sectors located between said decimal point position and any digit sectors having any pulses recorded in the information bit positions thereof; and
means in said display means responsive to each of said tag bits for modifying the visual presentation of the digit stored in the digit sector storing said tag bit.

5. Calculator apparatus comprising:
memory means including a plurality of number storing registers, each register including a plurality of ordered digit sectors, each digit sector including several information bit positions and at least one control bit position;
means for storing a digit in each digit sector by recording a pulse in each of a number of information bit positions equal to the value of the digit being stored;
means for defining a decimal point position;
means for recording a tag bit in the control bit position of digit sectors having any pulses recorded in the information bit positions thereof and in digit sectors located between said decimal point position and any digit sectors having any pulses recorded in the information bit positions thereof;
means for sequentially accessing said stored digits;
display means responsive to said sequentially accessed digits for presenting a visual display thereof; and
means in said display means responsive to each of said digits accessed from a digit sector storing a tag bit for modifying the intensity with which said digit is displayed.

6. A calculator apparatus comprising:
a memory having a plurality of number storage regters, each number storage register including a plurality of digit storage locations, each digit storage location including a plurality of information bit storage positions and a control bit storage position;
a keyboard including a plurality of register keys, a plurality of numeric keys, and a plurality of function keys;
means for identifying one of said digit storage locations;
means responsive to the actuation of each of said numeric keys for generating a different number of pulses;
means responsive to the actuation of each of said register keys for storing said number of generated pulses in a different one of said registers in said identified digit storage location with one of said pulses being stored as a tag bit in the control bit storage position thereof and each of said other pulses being stored in a different one of said information bit storage positions thereof;
means responsive to the selective actuation of each of said function keys for performing selected operaations with respect to the numbers stored in said registers;
edit means responsive to the performance of certain ones of said operations for determining in which of said digit storage locations meaningful digits are stored;
means in said edit means for recording a tag bit in said control bit storage position of each digit storage location storing a meaningful digit;

means for continually displaying the numbers stored in said registers and for distinguishing those digits stored in locations storing a tag bit from those digits stored in locations not storing a tag bit.

7. The apparatus of claim 6 including means for defining a decimal point position and wherein said meaningful digits comprise digits stored in digit storage locations between said decimal point position and a digit storage locaton having pulses stored in the information bit storage positions thereof.

References Cited

UNITED STATES PATENTS

| | | | |
|---|---|---|---|
| 3,046,527 | 7/1962 | Rowley et al. | 340—167 |
| 2,944,733 | 7/1960 | Austin | 235—61.6 |
| 2,932,812 | 4/1960 | O'Neil | 340—23 |
| 2,853,696 | 9/1958 | Mendelson | 340—173 |
| 2,848,708 | 8/1958 | Burkhart et al. | 340—173 |
| 3,270,337 | 8/1966 | Howard | 343—5 |
| 3,235,867 | 2/1966 | Wulf-Dieter Wirth | 343—16 |
| 3,210,759 | 10/1965 | Davis et al. | 343—6.5 |
| 3,191,169 | 6/1965 | Shulman et al. | 343—5 |
| 3,185,966 | 5/1965 | Bennett et al. | 340—172.5 |
| 3,182,308 | 5/1965 | Dutton et al. | 343—5 |
| 3,158,858 | 11/1964 | Ragen et al. | 343—5 |
| 3,158,857 | 11/1964 | Crosno et al. | 343—5 |
| 3,123,824 | 3/1964 | Sherertz | 343—11 |
| 3,121,860 | 2/1964 | Shaw | 340—172.5 |
| 3,058,659 | 10/1962 | Demmer et al. | 235—176 |

ROBERT C. BAILEY, *Primary Examiner.*

G. D. SHAW, *Assistant Examiner.*